US009400587B2

(12) United States Patent
Roberts et al.

(10) Patent No.: US 9,400,587 B2
(45) Date of Patent: Jul. 26, 2016

(54) SYSTEMS AND METHODS OF FACILITATING BROWSING OF MEDIA PROGRAMS DISTRIBUTED BY WAY OF A PLURALITY OF DIFFERENT MEDIA DISTRIBUTION MODELS

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 308 days.

(21) Appl. No.: 14/069,234

(22) Filed: Oct. 31, 2013

(65) Prior Publication Data

US 2014/0157124 A1     Jun. 5, 2014

Related U.S. Application Data

(60) Provisional application No. 61/732,247, filed on Nov. 30, 2012.

(51) Int. Cl.

| | |
|---|---|
| *G06F 3/00* | (2006.01) |
| *G06F 3/0481* | (2013.01) |
| *H04L 29/08* | (2006.01) |
| *G06F 3/0482* | (2013.01) |
| *H04N 21/4722* | (2011.01) |
| *H04N 21/472* | (2011.01) |
| *H04N 21/218* | (2011.01) |

(Continued)

(52) U.S. Cl.
CPC ............ *G06F 3/0481* (2013.01); *G06F 3/0482* (2013.01); *G06Q 30/02* (2013.01); *G06Q 30/0607* (2013.01); *G06Q 30/0609* (2013.01); *H04L 67/10* (2013.01); *H04N 21/218* (2013.01); *H04N 21/2543* (2013.01); *H04N 21/27* (2013.01); *H04N 21/472* (2013.01); *H04N 21/4722* (2013.01); *H04N 21/47202* (2013.01); *H04N 21/47214* (2013.01); *H04N 21/482* (2013.01); *H04N 21/4882* (2013.01)

(58) Field of Classification Search
CPC ...................................... H04L 67/10
USPC ........................................ 715/716
See application file for complete search history.

(56) References Cited

U.S. PATENT DOCUMENTS

| | | | | |
|---|---|---|---|---|
| 7,234,609 B2 * | 6/2007 | DeLazzer | ............... | G07F 7/069 221/10 |
| 7,269,854 B2 * | 9/2007 | Simmons | ........... | H04N 7/17336 348/E7.071 |

(Continued)

*Primary Examiner* — William Titcomb

(57) ABSTRACT

Exemplary systems and methods may provide a user interface configured to provide a user with access to a plurality of browse contexts associated with a plurality of distribution models by way of which media programs are distributed through a media service, provide one or more user interface tools for use by the user to select which of the browse contexts is presented in the user interface and values of a refinement setting to be applied to refine the content of the browse contexts, track the values of the refinement setting individually for each of the browse contexts, and use the tracked values of the refinement setting to refine the content of the browse contexts presented in the user interface. Corresponding systems and methods are also described.

23 Claims, 18 Drawing Sheets

(51) Int. Cl.
*H04N 21/482* (2011.01)
*H04N 21/27* (2011.01)
*G06Q 30/02* (2012.01)
*G06Q 30/06* (2012.01)
*H04N 21/2543* (2011.01)
*H04N 21/488* (2011.01)

(56) References Cited

U.S. PATENT DOCUMENTS

| | | | | |
|---|---|---|---|---|
| 7,962,937 | B2* | 6/2011 | Cho | H04N 7/17318 725/37 |
| 8,763,057 | B2* | 6/2014 | Ruffini | H04N 21/2181 725/93 |
| 8,799,959 | B2* | 8/2014 | Young | H04N 21/42203 725/37 |
| 8,976,513 | B2* | 3/2015 | Sullivan | G06F 1/1601 361/679.01 |
| 9,026,448 | B2* | 5/2015 | Koivuniemi | H04N 21/42203 704/275 |
| 9,031,848 | B2* | 5/2015 | Cheong | H04N 21/42203 704/275 |
| 9,043,837 | B2* | 5/2015 | Roberts | H04L 67/10 725/40 |
| 9,083,548 | B2* | 7/2015 | Holmes | H04L 12/40013 |
| 9,106,957 | B2* | 8/2015 | Koivuniemi | H04N 21/4622 |
| 2005/0246374 | A1* | 11/2005 | Blinn | G06Q 10/10 |
| 2009/0276813 | A1* | 11/2009 | Bleiweiss | H04N 19/115 725/82 |
| 2010/0120531 | A1* | 5/2010 | Esaki | A63F 13/10 463/35 |
| 2010/0186579 | A1* | 7/2010 | Schnitman | G10H 1/0025 84/625 |
| 2012/0060094 | A1* | 3/2012 | Irwin | H04N 21/4314 715/719 |
| 2012/0233640 | A1* | 9/2012 | Odryna | H04N 21/4828 725/45 |
| 2012/0275761 | A1* | 11/2012 | Li | H04N 9/80 386/239 |
| 2013/0013688 | A1* | 1/2013 | Wang | H04L 61/1541 709/204 |
| 2013/0013704 | A1* | 1/2013 | Pope | H04L 61/1541 709/206 |
| 2013/0024495 | A1* | 1/2013 | Armstrong | G05B 19/0426 709/203 |
| 2013/0046707 | A1* | 2/2013 | Maskatia | H04N 21/4622 705/347 |
| 2013/0060648 | A1* | 3/2013 | Maskatia | G06Q 30/02 705/22 |
| 2013/0060767 | A1* | 3/2013 | Bowers | G06F 17/30038 707/724 |
| 2013/0066464 | A1* | 3/2013 | Maskatia | G06Q 30/0631 700/234 |
| 2013/0227013 | A1* | 8/2013 | Maskatia | H04L 65/403 709/204 |
| 2014/0081845 | A1* | 3/2014 | Lavu | G06Q 40/02 705/39 |
| 2014/0156792 | A1* | 6/2014 | Roberts | H04L 67/10 709/217 |
| 2014/0157314 | A1* | 6/2014 | Roberts | H04L 67/10 725/40 |
| 2014/0181218 | A1* | 6/2014 | Roberts | H04L 51/32 709/206 |
| 2014/0245336 | A1* | 8/2014 | Lewis, II | H04N 21/252 725/14 |
| 2014/0298169 | A1* | 10/2014 | Williams | H04N 21/25841 715/716 |
| 2014/0298385 | A1* | 10/2014 | Roberts | H04N 21/482 725/45 |
| 2014/0333664 | A1* | 11/2014 | Williams | G06Q 30/0643 345/633 |
| 2015/0020011 | A1* | 1/2015 | Roberts | G11B 27/28 715/767 |
| 2015/0113058 | A1* | 4/2015 | Zhang | H04L 65/403 709/204 |
| 2015/0120875 | A1* | 4/2015 | Yao | H04L 65/60 709/219 |
| 2015/0312375 | A1* | 10/2015 | Valey | H04L 67/42 709/203 |

* cited by examiner

| Browse Context | Media Format Refinement Setting | Media Rating Refinement Setting | Refinement Sort Setting |
|---|---|---|---|
| All Models Browse Context | All Formats | All Ratings | Release Date |
| Subscription Model Browse Context | HD | All Ratings | Release Date |
| Kiosk Model Browse Context | All Formats | All Ratings | Release Date |
| Rent/Buy Model Browse Context | SD | All Ratings | Release Date |

SYSTEMS AND METHODS OF FACILITATING BROWSING OF MEDIA PROGRAMS DISTRIBUTED BY WAY OF A PLURALITY OF DIFFERENT MEDIA DISTRIBUTION MODELS

RELATED APPLICATIONS

The present application claims priority under 35 U.S.C. §119(e) to U.S. Provisional Patent Application No. 61/732, 247, filed Nov. 30, 2012. The contents of the provisional patent application are hereby incorporated by reference in their entirety.

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video service typically provides a user of the service with tools for discovering video programs offered for access through the video service. While a conventional video service provides useful tools for discovery of the video programs offered by the video service, there remains room for new and/or improved tools that may further benefit users and/or a provider of the video service. For example, there remains room to improve user interface tools to better assist a user of the video service with browsing information about video programs offered for access through the video service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods of facilitating browsing of media programs distributed by way of a plurality of different media distribution models are described herein. In certain examples, systems and methods described herein may provide a user interface configured to provide a user with access to a plurality of media program browse contexts ("browse contexts") associated with a plurality of media distribution models ("distribution models") by way of which media programs are distributed through a media service. The systems and methods may further provide one or more user interface tools for use by the user to select which of the browse contexts is presented in the user interface and values of one or more refinement settings to be applied to refine the content of the browse contexts.

The systems and methods may track the values of the refinement settings individually for each of the browse contexts (e.g., throughout a user interface session). Accordingly, when any particular browse context is selected for presentation in the user interface, the systems and methods may use the tracked values of the refinement settings corresponding to the browse context to refine the content of the browse context presented in the user interface. Accordingly, different refinements may be tracked and applied to different browse contexts. This may facilitate toggling between browse contexts in the user interface in a manner that automatically applies previously selected values of refinement settings for a browse context to refine the content of the browse context being presented, without the user having to reselect the values each time a different browse context is presented.

The systems and methods described herein may benefit end users and/or a provider of a media service. For example, one or more of the features described herein may enhance user experiences with distribution-model-based contextual browsing of media programs of the media service. This and other benefits and/or advantages that may be provided by systems and methods described herein will be made apparent by the following detailed description. Exemplary systems and methods of facilitating browsing of media programs distributed by way of a plurality of different media distribution models will now be described in reference to the accompanying drawings.

Figure 1:
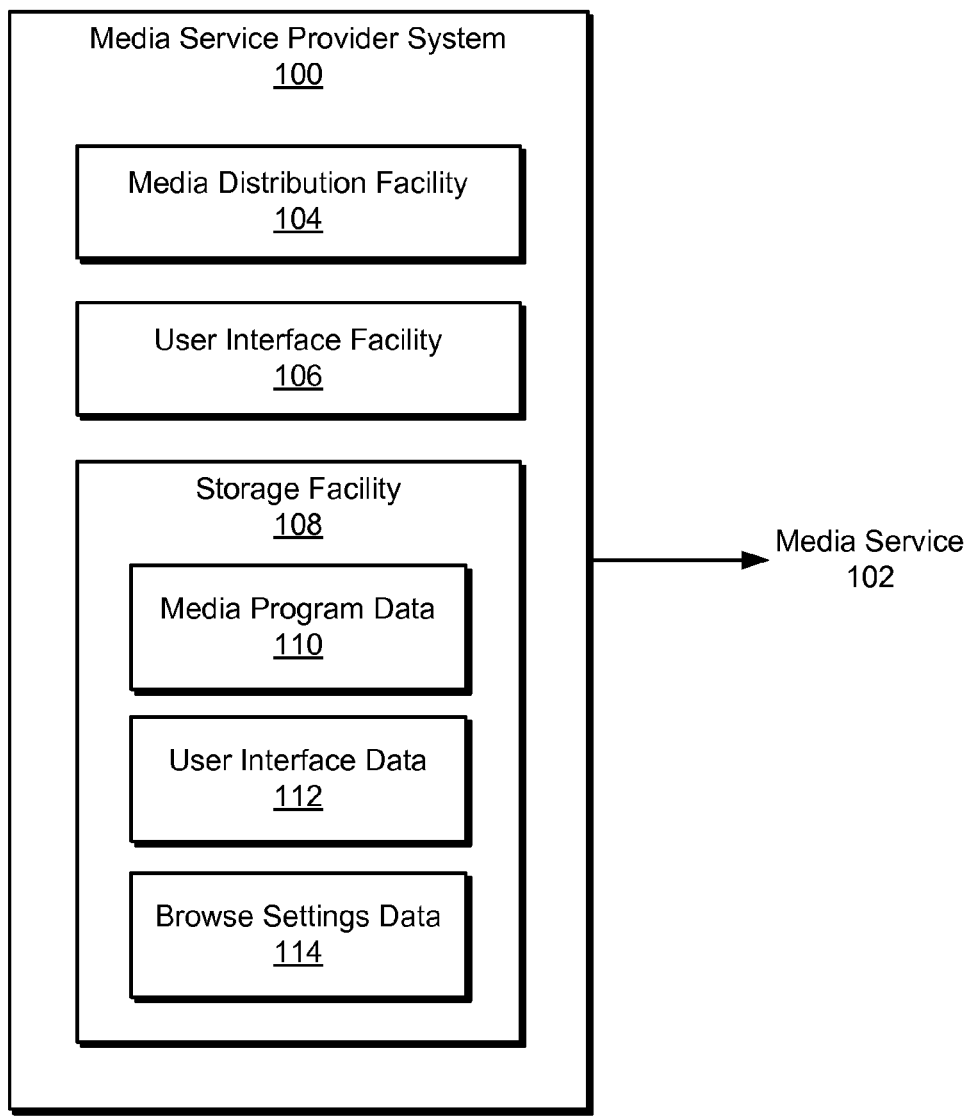
FIG. 1 illustrates an exemplary media service provider system according to principles described herein.

FIG. 1 illustrates an exemplary media service provider system 100 ("system 100"). System 100 may be configured to facilitate discovery, access, and/or consumption of media programs by one or more users. For example, system 100 may be configured to provide a media service 102 (e.g., a media distribution service and/or a media discovery service) to one or more end users of the media service 102 (e.g., one or more subscribers to the media service 102). System 100 may be associated with (e.g., operated by) a provider of the media service 102 ("service provider"). Through the media service 102, an end user of the media service may discover, access, and/or consume media programs distributed by system 100.

In certain examples, the media service 102 may be an integrated media service 102 at least because the media service 102 distributes media programs by way of multiple different media distribution models, thus providing an end user of the media service 102 with access to media programs by way of multiple different media distribution models. Examples of media distribution models associated with the media service 102 are described herein.

As used herein, the term "media program" may refer to any discrete instance of media content that may be distributed by the media service 102 for consumption by an end user of the media service 102. For example, a media program may refer to any television program, on-demand media program, pay-per-view media program, broadcast media program (e.g., broadcast television program), multicast media program (e.g., multicast television program), narrowcast media program (e.g., narrowcast video-on-demand program), Internet Protocol television ('IPTV") media program, advertisement, video, movie, audio program, radio program, video game, or any other media program that a user may access by way of the media service 102. Such media programs that are made available for user consumption by way of the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a user interface facility 106, and a storage facility 108 selectively and communicatively coupled to one another. The facilities may be communicatively coupled one to another by any suitable communication technologies.

It will be recognized that although facilities 104-108 are shown to be separate facilities in FIG. 1, any of those facilities may be combined into a single facility or split into additional facilities as may serve a particular implementation. Additionally or alternatively, one or more of the facilities 104-108 may be omitted from and external to system 100 in other implementations. For example, distribution facility 104 and/or storage facility 108 may be external of and communicatively coupled to system 100 in certain alternative implementations. Facilities 104-108 will now be described in more detail.

Storage facility 108 may be configured to store media program data 110 representative of content of and/or information about media programs that may be distributed by distribution facility 104, user interface data 112 generated and/or used by user interface facility 106 to provide one or more user interfaces for use by end users of the media service 102 to discover, access, and/or consume the media programs, and browse settings data 114 representative of one or more browse settings (e.g., any of the refinement settings described herein) configured for use by user interface facility 106 to provide a user interface, such as described herein. Storage facility 108 may maintain additional or alternative data as may serve a particular implementation.

Distribution facility 104 may be configured to distribute media programs to users of the media service 102. Distribution facility 104 may be configured to distribute media programs in any way and/or form suitable to facilitate consumption of the media programs by users of the media service 102.

In certain examples, distribution facility 104 may be configured to distribute media programs by way of multiple different media program distribution channels. For example, distribution facility 104 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs, and/or other physical computer-readable copies of media programs are distributed to users of the media service 102.

Figure 2:
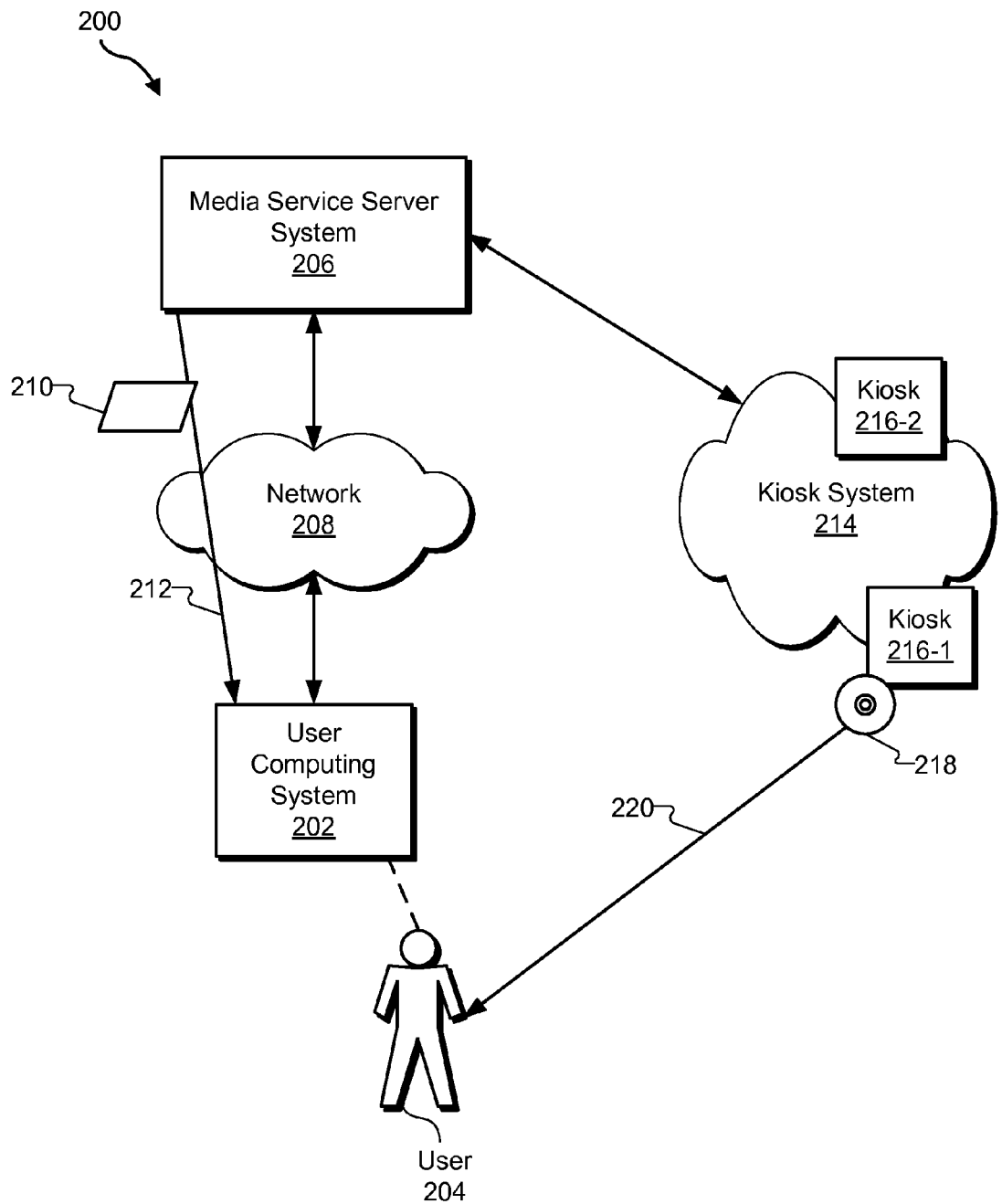
FIG. 2 illustrates an exemplary media programs distribution configuration according to principles described herein.

FIG. 2 illustrates an exemplary media programs distribution configuration 200 in which system 100 is implemented. Components of system 100 may be implemented by one or more of the elements of the configuration 200 shown in FIG. 2. As shown, the configuration 200 may include a user computing system 202 associated with a user 204, who may be an end user of the media service 102. User computing system 202 may be in communication with a media service server system 206 ("server system 206"), which may include one or more computing devices (e.g., server devices) remotely located from user computing system 202 and/or operated by a provider of the media service 102.

User computing system 202 and server system 206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and server system 206. Communications between user computing system 202 and server system 206 may be transported using any one of the above-listed networks, or any combination or sub-combination of the above-listed networks. Alternatively, user computing system 202 and server system 206 may communicate in another way such as by direct connections between user computing system 202 and server system 206.

The configuration 200 may support distribution of media programs, through the media service 102, by way of multiple different media distribution channels, such as a digital media distribution channel and a physical media distribution channel. As shown, server system 206 may distribute media programs such as digital data 210 representative of a media program to user computing system 202 by way of a digital media distribution channel 212. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, server system 206 may be in communication with a media vending kiosk system 214, which may include one or more geographically distributed vending kiosks 216 (e.g., vending kiosks 216-1 and 216-2) configured to vend physical copies of media programs, such as a physical copy 218 of a media program, to user 204 by way of a physical media distribution channel 220. For example, user 204 may visit a location of media vending kiosk 216-1 and obtain the physical copy 218 of the media program from the media vending kiosk 216-1. In certain examples, one or more of the vending kiosks 216 may include automated media vending machines.

The user computing system 202 may be configured for use by the user 204 to access the media service 102 provided by system 100. For example, the user 204 may utilize the user computing system 202 to access one or more user interfaces provided by system 100 as part of the media service 102, and to present the user interfaces for use by the user 204 to discover, access, and/or consume media programs distributed by way of the digital media distribution channel 212 and/or the physical media distribution channel 220 as part of the media service 102.

The user computing system 202 may include one or more user computing devices associated with (e.g., operated by) the user 204. Examples of such devices include, without limitation, a media player computing device (e.g., a media disc player device such as a DVD or BLU-RAY disc player device), a display device, a set-top box device, a digital video recording ("DVR") device, a computer, a tablet computer, a smart phone device, a gaming console, and any other device capable of accessing the media service 102 and/or media programs provided by system 100 by way of the media service 102.

In certain examples, the user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service 102) may be displayed. Such an example is illustrative only. Other examples of user computing system 202 may include any combination of user computing devices or a single user computing device configured to perform any of the user computing system and/or device operations described herein.

Returning to FIG. 1, in certain examples, distribution facility 104 may be configured to provide users of the media service 102 with access to media programs by way of a plurality of different media distribution models ("distribution models"). Each distribution model may define a particular way that an end user of the media service 102 may gain access to media programs through the media service 102. Thus, a user of the media service 102 may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-base distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
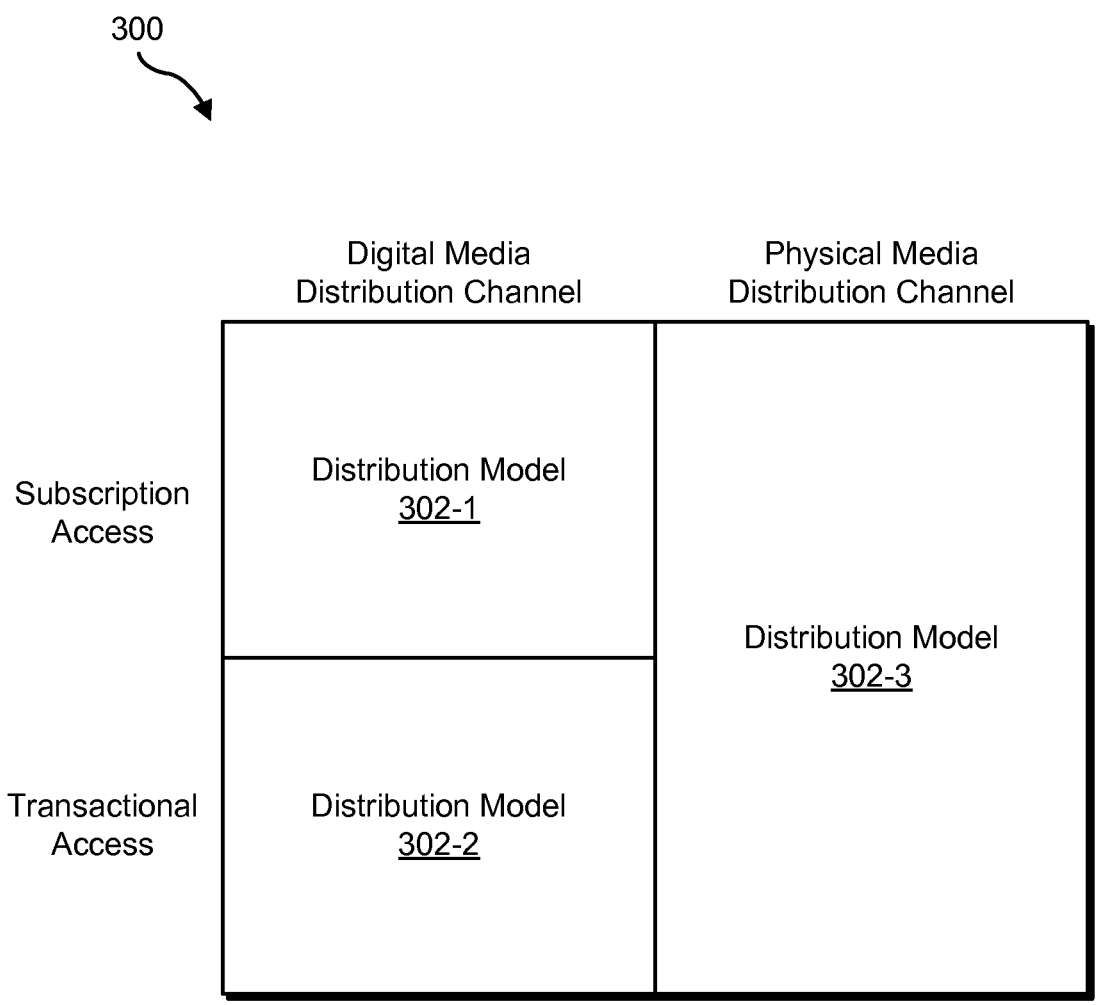
FIG. 3 illustrates a table representing an exemplary set of different media distribution models by way of which access to media programs may be provided by way of a media service according to principles described herein.

Distribution facility 104 may be configured to provide users of the media service 102 with access to media programs by way of any of the different distribution models described herein, or by way of any combination or sub-combination thereof. As an example, FIG. 3 illustrates a table 300 representing a set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based or transactional-based access to media programs by way of a physical media distribution channel. In certain examples, these distribution models 302 may be referred to as a "subscription" digital distribution model 302-1, an "on-demand" or "rent/buy" digital distribution model 302-2, and a "physical" or "kiosk" distribution model 302-3.

Media programs distributed by distribution facility 104 as part of the media service 102 may be assigned (e.g., by a provider of the media service 102) to one or more of the distribution models provided by distribution facility 104. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

Returning to FIG. 1, user interface facility 106 may be configured to provide a media service user interface through which a user (e.g., user 204) may interface with the media service 102 to discover, access, and/or consume media content. The user interface may be in any suitable form. For example, user interface facility 106 may be configured to provide a website, a client application user interface (e.g., a user interface provided by a client application such as a "mobile app" installed and running on the user computing system 202), a media player user interface, a graphical user interface ("GUI"), and/or any other form of user interface configured to facilitate user interaction with the media service 102. Accordingly, the user 204 may utilize the user computing system 202 to access a user interface provided by user interface facility 106 in order to interact with the media service 102 to discover, access, and/or consume media content distributed as part of the media service 102.

User interface facility 106 may perform one or more operations and/or provide one or more features configured to facilitate browsing, by a user, of media programs distributed by way of a plurality of different distribution models (e.g., media programs of media service 102). The browsing may include user discovery of browse content representing media programs in a user interface. Examples of operations and features configured to facilitate browsing of media programs in a user interface will now be described.

User interface facility 106 may provide a user interface configured to provide a user with access to multiple different browse contexts associated with distribution models by way of which media programs are distributed through media service 102. A "browse context," as used herein, refers to a context of a user interface in which browse content representing one or more media programs is selectively included in the user interface, for browsing by a user, based on one or more media distribution models by way of which the media programs are distributed. For example, a particular browse context may include browse content selected, by user interface facility 106, for inclusion in the user interface because the browse content represents media programs distributed by way of a particular media distribution model. To this end, the particular media distribution model may be used by user interface facility 106 as a filter condition to select, for inclusion in the particular browse context of the user interface, browse content representing a filtered set of media programs that are distributed by way of the particular media distribution model. A browse context may be associated with only a single distribution model (e.g., may include browse content representing only media programs distributed by way of the single distribution model) or associated with a set of multiple distribution models (e.g., may include browse content representing only media programs distributed by way of any of the distribution models in the set).

Figure 4:
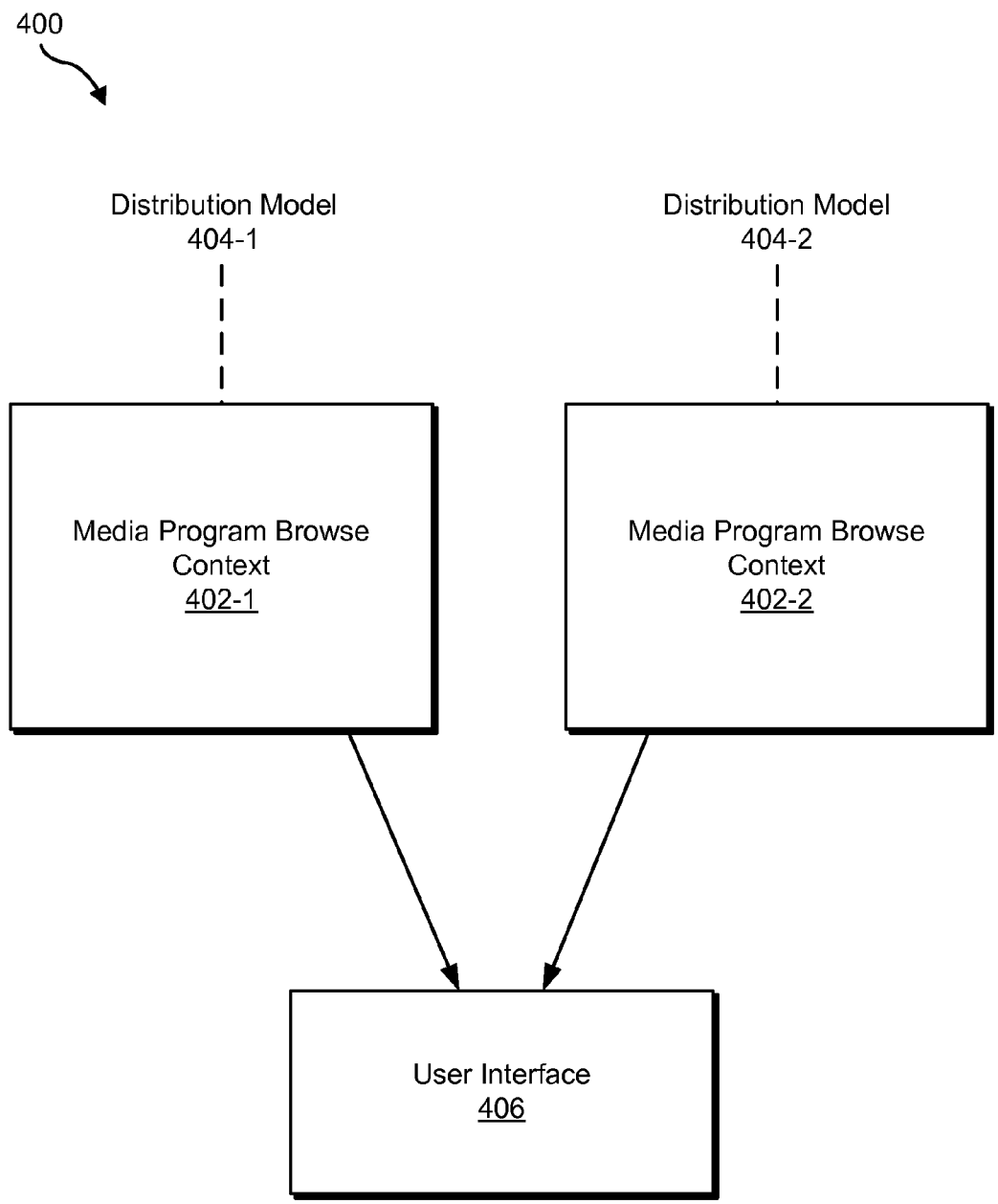
FIG. 4 illustrates an exemplary configuration in which a plurality of media program browse contexts associated with a plurality of media distribution models are available for selective presentation in a user interface according to principles described herein.

FIG. 4 illustrates an exemplary configuration 400 in which a plurality of media program browse contexts 402 (e.g., browse contexts 402-1 and 402-2) associated with a plurality of media distribution models 404 (e.g., distribution models 404-1 and 404-2) are available for selective presentation in a user interface 406 according to principles described herein. In the illustrated example, browse context 402-1 is associated with distribution model 404-1, and browse context 402-2 is associated with distribution model 404-2. Accordingly, browse context 402-1 may include browse content selected by user interface facility 106 for inclusion in browse context 402-1 based on a relationship of the browse content to distribution model 404-1 (e.g., the browse content represents media programs distributed by way of distribution model 404-1), and browse context 402-2 may include browse content selected by user interface facility 106 for inclusion in browse context 402-2 based on a relationship of the browse content to distribution model 404-2 (e.g., the browse content represents media programs distributed by way of distribution model 404-2).

To illustrate one example, distribution model 404-1 may be a digital distribution model that utilizes a digital distribution channel (e.g., digital distribution channel 212) to distribute media programs, and distribution model 404-2 may be a physical distribution model that utilizes a physical distribution channel (e.g., physical distribution channel 220) to distribute media programs. In such an example, when browse context 402-1 is selected for presentation in user interface 406, user interface facility 106 may select browse content representing media programs distributed by way of the digital distribution model for inclusion in browse context 402-1 in user interface 406. When browse context 402-2 is selected for presentation in user interface 406, user interface facility 106 may select browse content representing media programs distributed by way of the physical distribution model for inclusion in browse context 402-2 in user interface 406. Accordingly, a user may interact with user interface 406 to access browse context 402-1 to browse media programs distributed by way of the digital distribution model and/or to access browse context 402-2 to browse media programs distributed by way of the physical distribution model.

Configuration 400 is illustrative only. Any number of browse contexts associated with any number and/or combinations of distribution models may be available for access and presentation in user interface 406.

User interface facility 106 may be configured to select which of a plurality of browse contexts is presented in a user interface. In certain examples, only one browse context at a time is presented in a media browse view of a user interface. Examples of such user interface browse views are described herein.

User interface facility 106 may be configured to select a browse context for presentation in a user interface in any suitable manner. As an example, a particular browse context may be predefined as a default browse context to be initially presented in a user interface, such as when a browse view of the user interface is initially launched. As another example, a particular browse context may be selected by user interface facility 106 for presentation in a user interface in response to a user request that the particular browse context be presented in the user interface.

User interface facility 106 may be configured to provide a browse context selection tool for use by the user to select which of the browse contexts is presented in the user interface. The browse context selection tool may be provided in the user interface (e.g., in a user interface browse view) and may include a menu of options associated with the browse contexts. The user may select an option to request that the browse context corresponding to the option be presented in the user interface. For example, the browse context selection tool may include a menu bar having toggle buttons for selection by the user to toggle between browse contexts. An exemplary browse context selection tool is described in more detail herein.

As described herein, a browse context may include browse content selected by user interface facility 106 for inclusion in the browse context based on the browse content representing media programs distributed by way of a distribution model associated with the browse context. To this end, user interface facility may filter, based on the distribution model associated with the browse context, media programs distributed through the media service 102, to determine a filtered set of the media programs that are distributed by way of the distribution model.

User interface facility 106 may be further configured to refine the filtered set of the media programs that are distributed by way of the distribution model. User interface facility 106 may refine the filtered set of the media programs in any suitable way and based on any suitable set of one or more refinement settings. For example, user interface facility 106 may refine the filtered set of the media programs, based on a value of a refinement setting, to determine a refined, filtered set of the media programs.

A refinement setting may be associated with any attribute of a media program, such as an attribute that may be represented by metadata for the media program. Examples of such attributes include, without limitation, a title, a synopsis, a genre, a cast, a director, a studio, a producer, a rating, and an available format of the media program.

A value of a refinement setting may include any value of an attribute of a media program. As an example, if the media program attribute is a media format of the media program, examples of values of the attribute may include a high definition ("HD") format, a standard definition ("SD") format, a DVD format, and a BLU-RAY disc format. As another example, if the media program attribute is a rating of the media program, examples of values of the attribute may include Motion Picture Association of America ("MPAA") ratings such as "G," "PG," "PG-13," and "R" ratings.

User interface facility 106 may be configured to populate the browse context with browse content that represents a refined, filtered set of media programs that has been determined by user interface facility 106 in any of the ways described herein. Examples of such browse content are described herein.

The filtering of media programs to determine a filtered set of media programs, the refining of the filtered set of media programs, and the populating a browse context with browse content representing a refined, filtered set of media programs may be performed by user interface facility 106 as part of providing the browse context for presentation in the user interface, such as in a user interface browse view. Examples of such user interface browse views are described herein.

User interface facility 106 may be configured to provide a refinement tool for use by a user to select a value of a refinement setting to be used to refine the browse content of whichever of the browse contexts is currently presented in the user interface. The refinement tool may be provided in the user interface, such as in a user interface browse view. Accordingly, when a particular browse context is presented in the user interface, the user may utilize the refinement tool to select a value of a refinement setting to be used by user interface facility 106 to refine the browse content of the browse context. In response, user interface facility 106 may refine the browse content based on the value of the refinement setting such that the browse content presented in the user interface represents a refined set of media programs. The refining may include filtering the set of media programs represented by the browse content when the refinement setting is a refinement filter setting and/or sorting the set of media programs represented by the browse content when the refinement setting is a refinement sort setting. Examples of refinement settings, values of refinement settings, and refinement tools are described herein.

User interface facility 106 may be configured to track values of the refinement setting in relation to browse contexts. That is, user interface facility 106 may track, individually, an individual value of the refinement setting for each of the browse contexts.

To illustrate one example, user interface facility 106 may detect a user selection of a first value of a refinement setting while a first browse context is being presented in a user interface. In response, user interface facility 106 may refine the browse content of the first browse context based on the first value of the refinement setting. User interface facility 106 may track the value of the refinement setting for the first browse context by recording the first value of the refinement setting as the most recently selected value of the refinement setting to be used to refine the first browse context.

In addition, user interface facility 106 may detect a user selection of a second value of the refinement setting while a second browse context is being presented in a user interface. In response, user interface facility 106 may refine the browse content of the second browse context based on the second value of the refinement setting. User interface facility 106 may track the value of the refinement setting for the second browse context by recording the second value of the refinement setting as the most recently selected value of the refinement setting to be used to refine the second browse context.

Figure 5:
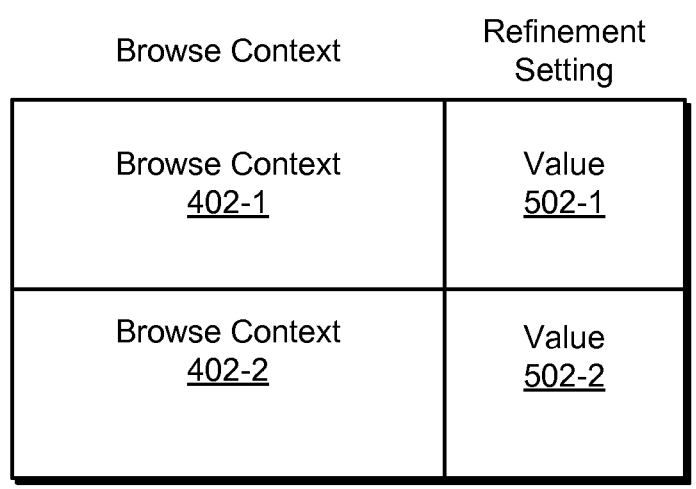
FIG. 5 illustrates a table representing exemplary mappings of tracked values of a refinement setting to media program browse contexts according to principles described herein.

User interface facility 106 may track the values of the refinement setting in any suitable way. For example, FIG. 5 illustrates a table 500 that includes data representing tracked values 502 (e.g., tracked values 502-1 and 502-2) of a refinement setting mapped to browse contexts 402 (e.g., browse contexts 402-1 and 402-2). In the illustrated example, the first row of table 500 represents a mapping of a first value 502-1 of the refinement setting to a first browse context 402-1, and a second row of table 500 represents a mapping of a second value 502-2 of the refinement setting to a second browse context 402-1. When a value of the refinement setting is changed with respect to one of the browse contexts 402, user interface facility 106 may track the value by updating table 500 accordingly to reflect the change. User interface facility 106 may use table 500 or any other suitable data structure to track values of a refinement setting in relation to browse contexts.

User interface facility 106 may be configured to track values of a refinement setting for browse contexts for any suitable period of time. In certain examples, user interface facility 106 may be configured to track values of a refinement setting for browse contexts throughout a user interface session. A user interface session may be defined to begin at any suitable point, such as with a launch of a user interface, a launch of a user interface browse view in a user interface, an access of a website, a launch of an application, a login of a user to a user interface, or another event that may be indicative of a beginning of a user session with a user interface. A user interface session may be defined to end at any suitable point, such as with a closing of a user interface, a closing of a user interface browse view, a navigation away from a website, a closing of an application, a logout of a user from a user interface, or another event that may be indicative of an ending of a user session with a user interface. In examples in which user interface facility 106 is configured to track values of a refinement setting for a user interface session, user interface facility 106 may be configured to reset the values to predefined default values with a termination of the user interface session. In certain alternative examples, user interface facility 106 may track values of a refinement setting for browse contexts across user sessions with a user interface. These examples are illustrative only. User interface facility 106 may track values of a refinement setting for browse contexts for any other defined duration, or indefinitely for a user.

User interface facility 106 may be configured to use a tracked value of a refinement setting to define browse content to be used to populate a browse context presented in a user interface. For example, user interface facility 106 may detect a selection of a browse context for presentation in a user interface. In response, user interface facility 106 may provide the browse context for presentation in the user interface. This may include user interface facility 106 1) filtering, based on a distribution model associated with the browse context, media programs distributed through media service 102 to determine a filtered set of the media programs for the browse context, 2) refining, based on the tracked value of the refinement setting for the browse context, the filtered set of the media programs for the browse context to determine a refined, filtered set of the media programs for the browse context, and 3) populating the browse context with browse content representing the refined, filtered set of the media programs for the browse context.

As described herein, user interface facility 106 may provide a browse context selection tool for use by a user to toggle between browse contexts in a user interface. Accordingly, when a user provides input to toggle from a first browse context to a second browse context in the user interface, user interface facility 106 may detect a selection of the second browse context for presentation in the user interface. In response, user interface facility 106 may toggle from a presentation of the first browse context to a presentation of a second browse context in the user interface. To this end, user interface facility 106 may provide the second browse context for presentation in the user interface, which may include user interface facility 106 1) filtering, based on a distribution model associated with the second browse context, media programs distributed through media service 102 to determine a filtered set of the media programs for the second browse context, 2) refining, based on the tracked value of the refinement setting for the second browse context, the filtered set of the media programs for the second browse context to determine a refined, filtered set of the media programs for the second browse context, and 3) populating the second browse context with browse content representing the refined, filtered set of the media programs for the second browse context.

FIGS. 6-12 illustrate examples of a media program browse view of a user interface that may be provided by user interface facility 106 for display on a display screen and in which browse contexts may be selectively presented.

Figure 6:
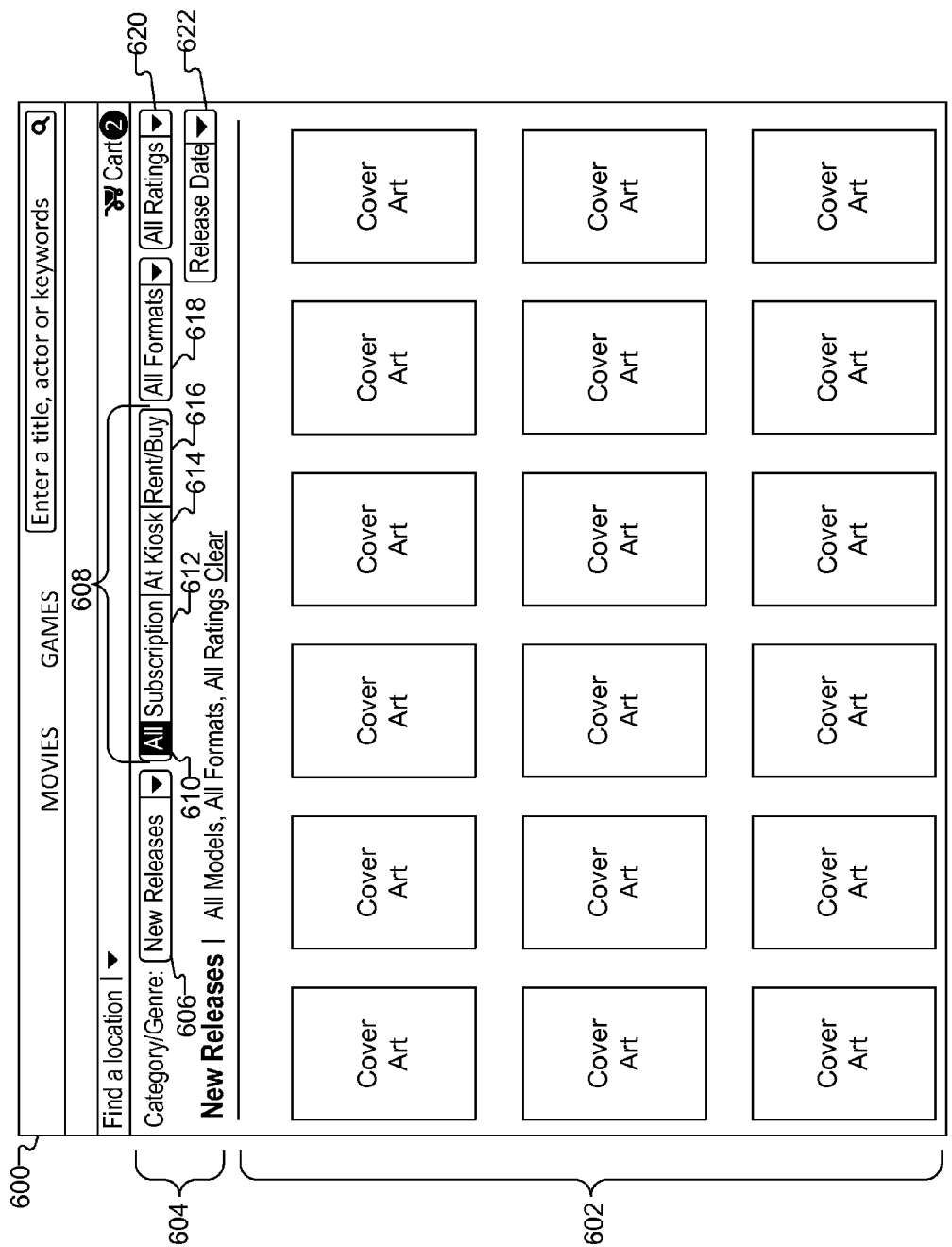
FIGS. 6-12 illustrate examples of a media browse view of a user interface according to principles described herein.

FIG. 6 illustrates a media browse view 600 ("browse view 600") as may be displayed on a display screen. When browse view 600 is displayed, a user may browse for media programs, such as by providing input to navigate browse content displayed in a browse area 602 of browse view 600. As shown, the browse content may include a grid of images (e.g., cover art images) that represent media programs available for access through the media service 102.

Browse view 600 may further include a filter area 604 that includes one or more tools for filtering and/or sorting the browse content displayed in browse area 602. As shown, filter area 604 may include a media program category selection tool 606 for use by a user to select a particular category of media programs to be represented in browse area 602. In FIG. 6, a particular category labeled "New Releases" is selected as a media program category by which to filter the media programs represented in browse view 600. With this media program category selected, user interface facility 106 may populate browse area 602 with browse content representing media programs that are new releases.

While the browse view 600 shown in FIG. 6 is displayed, a user may select tool 606 to open a drop-down menu of media program categories. The menu may include any category of media programs, such as a media program theme, a media program genre, a defined collection of curated media programs, and/or any other category of media programs. A user may select another category from the drop down menu. User interface facility 106 may detect the user selection and update the browse content in browse area 602 based on the newly selected media program category to represent media programs associated with the newly selected category.

As further shown in FIG. 6, filter area 604 may include a browse context selection tool 608 for use by a user to select a particular browse context for presentation in browse area 602 of browse view 600. Browse context selection tool 608 may include a menu of options (e.g., a menu bar of toggle buttons) representing user selectable browse contexts associated with distribution models by way of which media programs are distributed through media service 102. In the illustrated example, browse context selection tool 608 includes an option 610 labeled "All" and associated with a browse context associated with all distribution models by way of which media programs are distributed through media service 102, an option 612 labeled "Subscription" and associated with a subscription distribution model by way of which media programs are distributed through media service 102, an option 614 labeled "At Kiosk" and associated with a kiosk distribution model by way of which media programs are distributed through media service 102, and an option 616 labeled "Rent/Buy" and associated with a Rent/Buy distribution model by way of which media programs are distributed through media service 102.

A user may provide input to select any of the options of the browse context selection tool 608 to request that a browse context associated with the selected option be presented in browse area 602 of browse view 600. Accordingly, the user may provide such input to toggle between the browse contexts presented in browse area 602 (e.g., from one browse context being presented to another browse context being presented in browse area 602). In FIG. 6, option 610 is selected and, consequently, browse area 602 includes browse content representing media programs distributed by any of the distribution models of media service 102. If, while option 610 is selected as shown in FIG. 6, a user selects option 612, user interface facility 106 may respond by toggling from the presentation of the browse context associated with all of the distribution models of media service 102 to a presentation of a browse context associated with only the subscription distribution model of media service 102.

Filter area 604 may also include one or more refinement tools. In FIG. 6, for example, filter area 604 includes a media format selection tool 618, a media rating selection tool 620, and a media sort selection tool 622 configured for use by a user to select refinement setting values for use by user interface facility 106 to refine the browse content presented in browse area 602. When a user utilizes a refinement tool to select a refinement setting value, user interface facility 106 may apply that refinement setting value to the browse context currently presented in browse view 600 by refining the browse content of the browse context in browse area 602. In addition, user interface facility 106 may track the selected value of the refinement setting for the browse context by mapping the selected refinement setting value to the browse context and recording the mapping such that the selected refinement setting value may continue to be used by user interface facility 106 to refine the browse context, such as described herein.

Media format selection tool 618 may be configured for use by a user to select a particular media format to be used by user interface facility 106 to refine the browse content of the browse context currently presented in browse area 602 of browse view 600, such as by filtering the browse content to represent a set of media programs that are accessible in the selected media format. In certain examples, media format selection tool 618 may be associated with a set of media format options. For example, such a set of media format options may include an HD option, an SD option, a DVD option, a BLU-RAY option, and an "all formats" option. Media format selection tool 618 may facilitate user selection of one of the media format options. For example, user interface facility 106 may be configured to provide a drop-down menu (e.g., in a pop-up window) that includes the set of media format options when a drop-down arrow of media format selection tool 618 is selected by the user. With the drop-down menu displayed, the user may select one of the media format options. User interface facility 106 may detect the user selection of a media format option and treat the selected option as a selected value of a media format refinement setting to be applied and tracked, as described herein.

Media format selection tool 618 may visually indicate a currently selected option, or value. In FIG. 6, for example, media format selection tool 618 includes text indicating that an "all formats" option is the currently selected media format value mapped to the browse context currently presented in browse view 600.

Media rating selection tool 620 may be configured for use by a user to select a particular media rating to be used by user interface facility 106 to refine the browse content of the browse context currently presented in browse area 602 of browse view 600, such as by filtering the browse content to represent a set of media programs that have the selected media rating. In certain examples, media rating selection tool 620 may be associated with a set of media rating options. For example, such a set of media rating options may include MPAA rating options such as a "G" option, a "PG" option, a "PG-13" option, an "R" option, and an "all ratings" option. Media rating selection tool 620 may facilitate user selection of one of the media rating options. For example, user interface facility 106 may be configured to provide a drop-down menu (e.g., in a pop-up window) that includes the set of media rating options when a drop-down arrow of media rating selection tool 620 is selected by the user. With the drop-down menu displayed, the user may select one of the media rating options. User interface facility 106 may detect the user selection of a media rating option and treat the selected option as a selected value of a media rating refinement setting to be applied and tracked, as described herein.

Media rating selection tool 620 may visually indicate a currently selected option, or value. In FIG. 6, for example, media rating selection tool 620 includes text indicating that an "all ratings" option is the currently selected media rating value mapped to the browse context currently presented in browse view 600.

Media sort selection tool 622 may be configured for use by a user to select a particular sort condition to be used by user interface facility 106 to refine the browse content of the browse context currently presented in browse area 602 of browse view 600 by sorting the browse content. Media sort selection tool 622 may be associated with a set of user selectable sort options. For example, such a set of sort options may include an option to sort by release dates of media programs, an option to sort by community ratings of media programs, an option to sort alphabetically (e.g., from A to Z) by title, and an option to sort reverse alphabetically (e.g., from Z to A) by title.

Media sort selection tool 622 may facilitate user selection of one of the sort options. For example, user interface facility 106 may be configured to provide a drop-down menu (e.g., in a pop-up window) that includes the set of sort options when a drop-down arrow of media sort selection tool 622 is selected by the user. With the drop-down menu displayed, the user may select one of the sort options. User interface facility 106 may detect the user selection of a sort option and treat the selected option as a selected value of a refinement sorting setting to be applied and tracked, as described herein.

Media sort selection tool 622 may visually indicate a currently selected sort option, or value. In FIG. 6, for example, media sort selection tool 622 includes text indicating that a "release date" sort option is the currently selected sort value mapped to the browse context currently presented in browse view 600.

When user interface facility 106 initially launches browse view 600 for display (e.g., an initial launch of browse view 600 in a user interface session), values of the refinement settings may be set to predefined default values. FIG. 6 may illustrate an example of browse view 600 as it may appear on initial launch, and the refinement tools may indicate that the default values of the refinement settings controllable with the refinement tools are set to default values. For example, media format selection tool 618 may indicate a current media format value of "all formats," media rating selection tool 620 may indicate a current media rating value of "all ratings," and media sort selection tool 622 may indicate a current refinement sorting value of "release date." These values may be set by user interface facility 106 as default values for the initial launch of browse view 600.

The user may use any of the refinement tools to provide input to change one or more of the values of the refinement settings for the browse context currently presented in browse view 600. The user may also use browse context selection tool 608 to toggle between browse contexts. An example of user interface facility 106 detecting such input, updating browse view 600 based on the input, tracking values of a refinement setting in view of the input, and using the tracked values of the refinement setting to populate browse view 600 will now be described.

Figure 7:
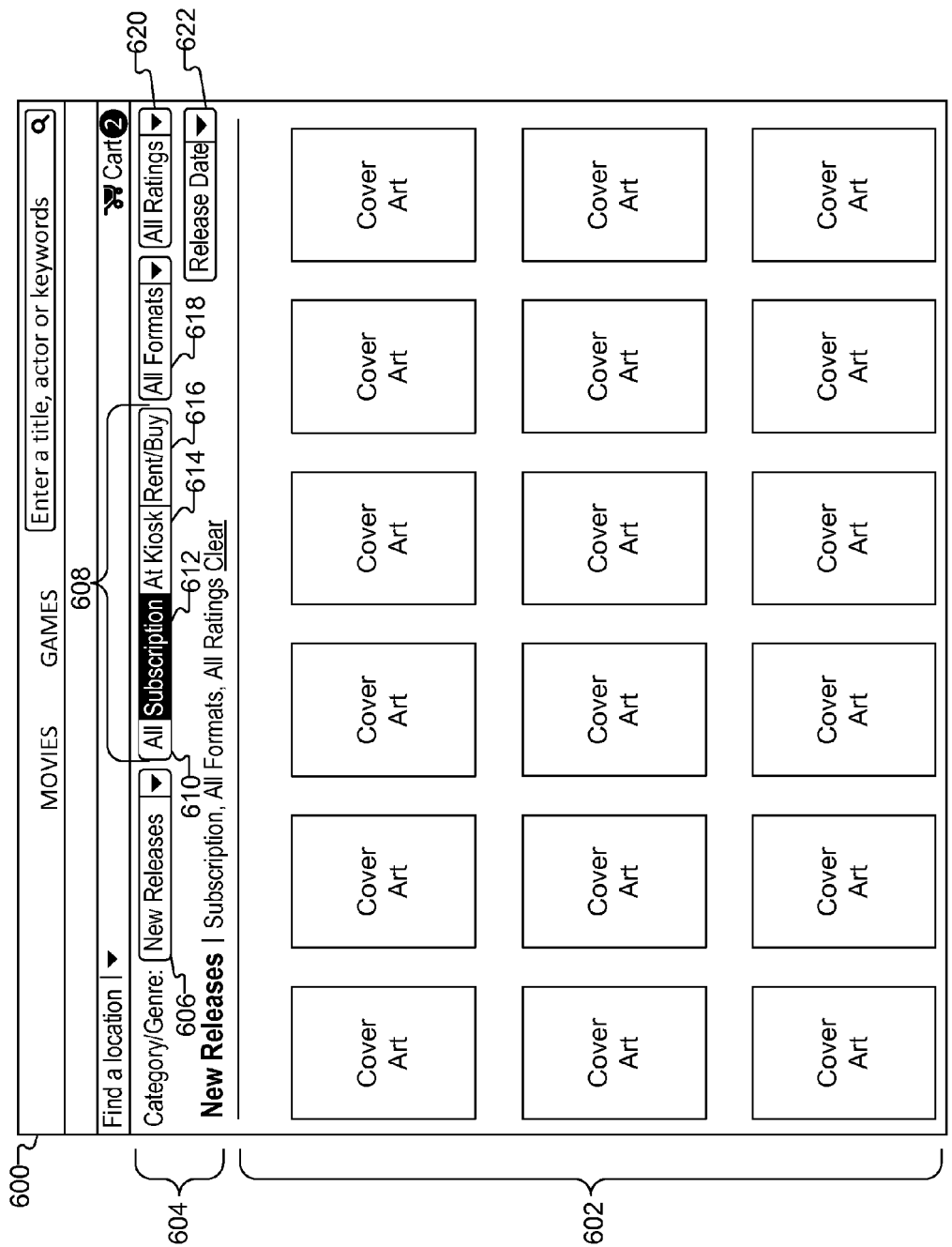

With browse view 600 displayed as shown in FIG. 6, a user may select option 612 to toggle from the currently presented browse context to a browse context associated with a subscription distribution model. User interface facility 106 may detect the selection of option 612 and update browse view 600 accordingly. For example, user interface facility 106 may highlight option 612 as shown in FIG. 7. User interface facility 106 may also update the browse content in browse area 602 to include only browse content representing media programs distributed by way of the subscription distribution model. In this manner, browse view 600 may be updated to present the subscription browse context associated with the subscription distribution model.

Figure 8:
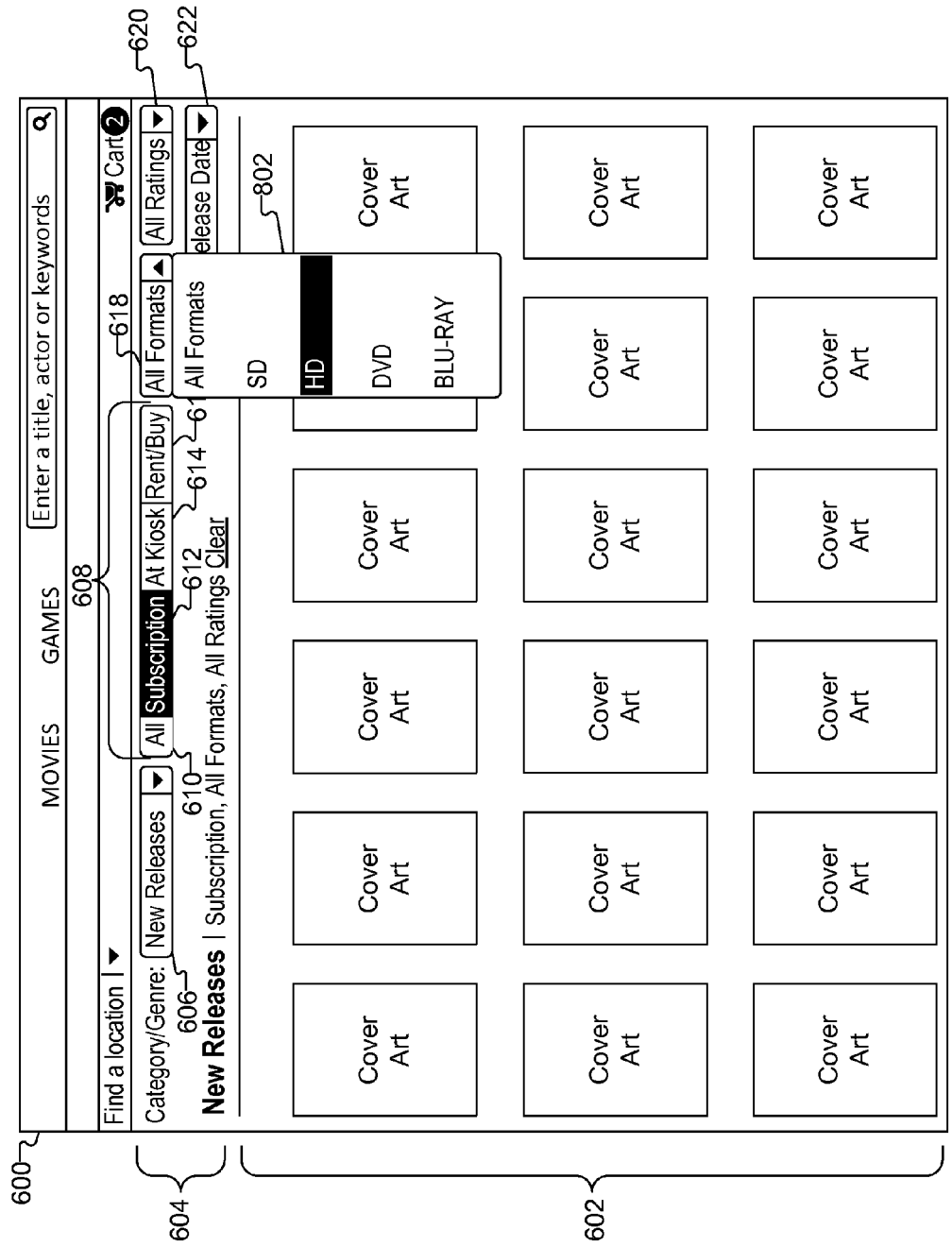
Figure 9:
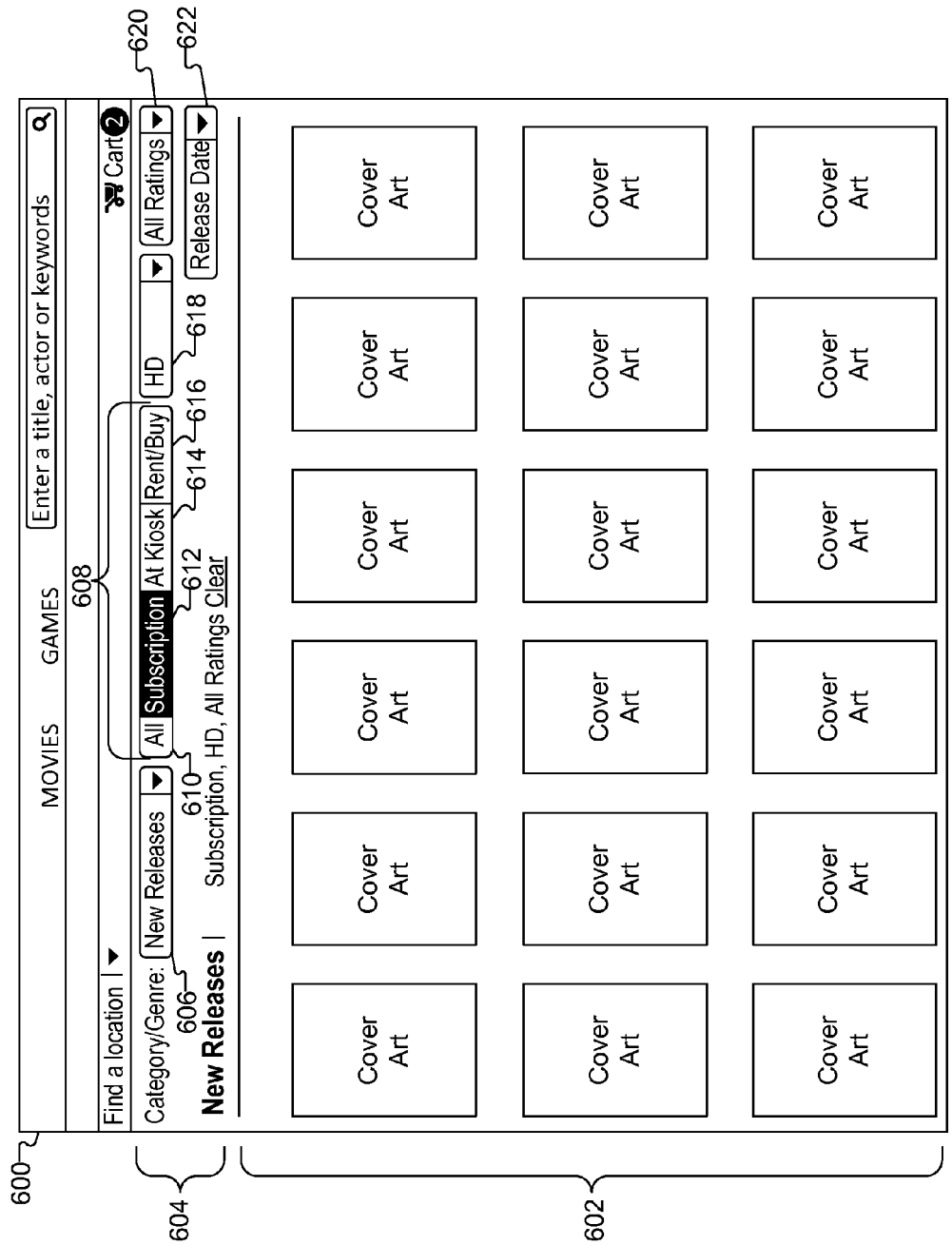

With the subscription browse context presented in browse view 600 as shown in FIG. 7, the user may utilize media format selection tool 618 to select a value of a media format refinement setting. For example, the user may select the drop-down arrow of media format selection tool 618, and user interface facility 106 may respond by providing a drop-down menu 802 of media format options as shown in FIG. 8. The user may provide input to select the "HD" option, as shown in FIG. 8. In response, user interface facility 106 may update browse view 600 accordingly. For example, user interface facility 106 may apply the "HD" value to the subscription browse context by further filtering the browse content in browse area 602 to include only browse content representing media programs that are available in the HD format. User interface facility 106 may also close the drop-down menu 802 and update media format selection tool 618 to indicate that the "HD" option is the currently selected value of the media format refinement setting, as shown in FIG. 9. User interface facility 106 may track the selected "HD" option as the current value of the media format refinement setting mapped to the subscription browse context.

Figure 10:
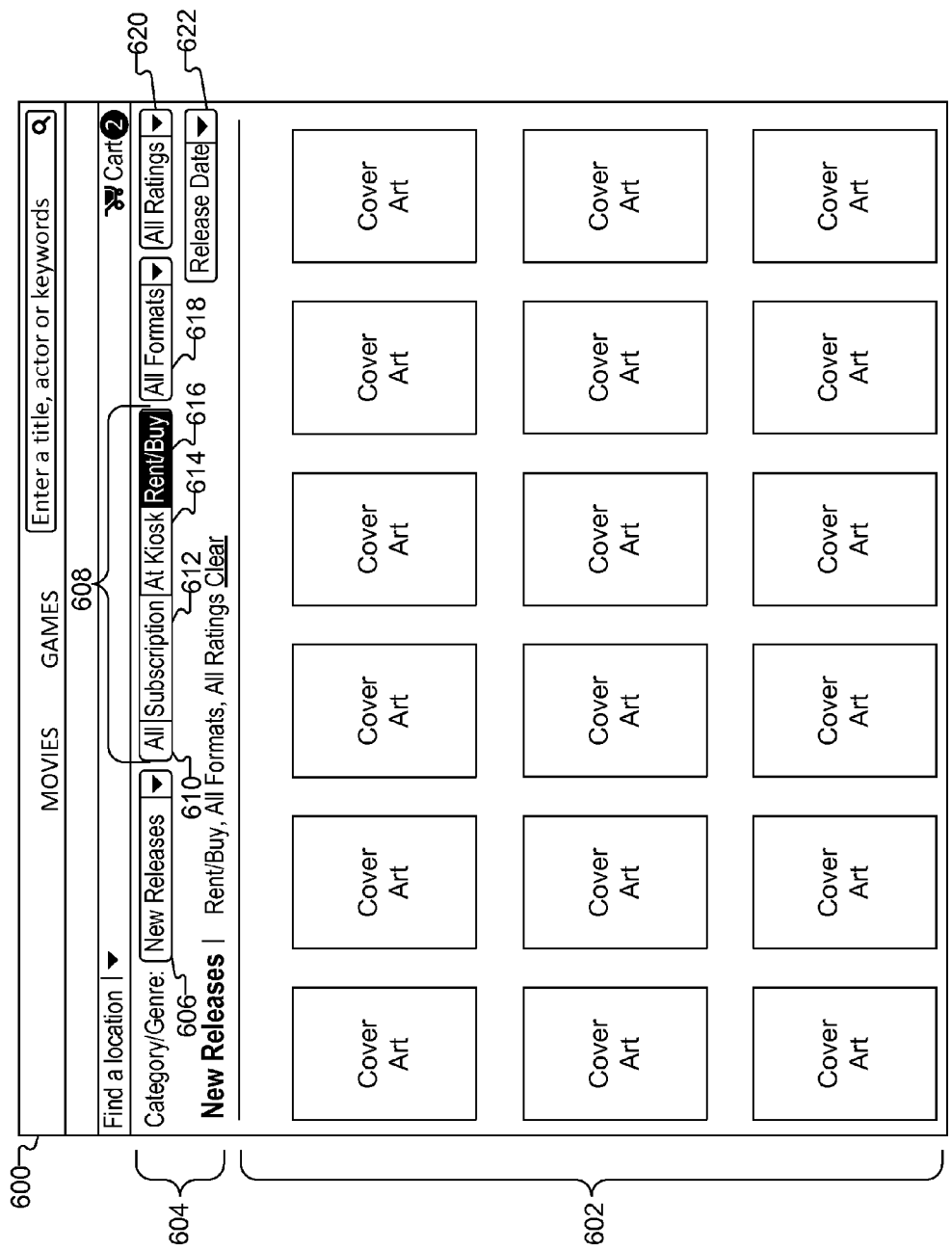

With browse view 600 displayed as shown in FIG. 9, the user may select option 616 to toggle from the currently presented subscription browse context to a rent/buy browse context associated with a rent/buy distribution model. User interface facility 106 may detect the selection of option 616 and update browse view 600 accordingly. For example, user interface facility 106 may highlight option 616 as shown in FIG. 10. User interface facility 106 may also update the browse content in browse area 602 to include only browse content representing media programs distributed by way of the rent/buy distribution model.

In addition, in response to the selection of option 616, user interface facility 106 may set the values of refinement settings to tracked values of the refinement settings for the rent/buy browse context. This may include changing the current value of the media format refinement setting from the "HD" value associated with the subscription browse context to an "all formats" value of the media format refinement setting based on a mapping of the "all formats" value of the media format refinement setting to the rent/buy browse context. In FIG. 10, media format selection tool 618 indicates that the "all formats" option is the currently selected value of the media format refinement setting.

User interface facility 106 may automatically apply the "all formats" value of the media format refinement setting to refine or remove refinement of the browse content in browse area 602 such that the browse content represents media programs that are available in any of the media formats.

In the above-described or similar manner, browse view 600 may be updated to present the rent/buy browse context associated with the rent/buy distribution model as part of toggling from another browse context to the rent/buy browse context.

Figure 11:
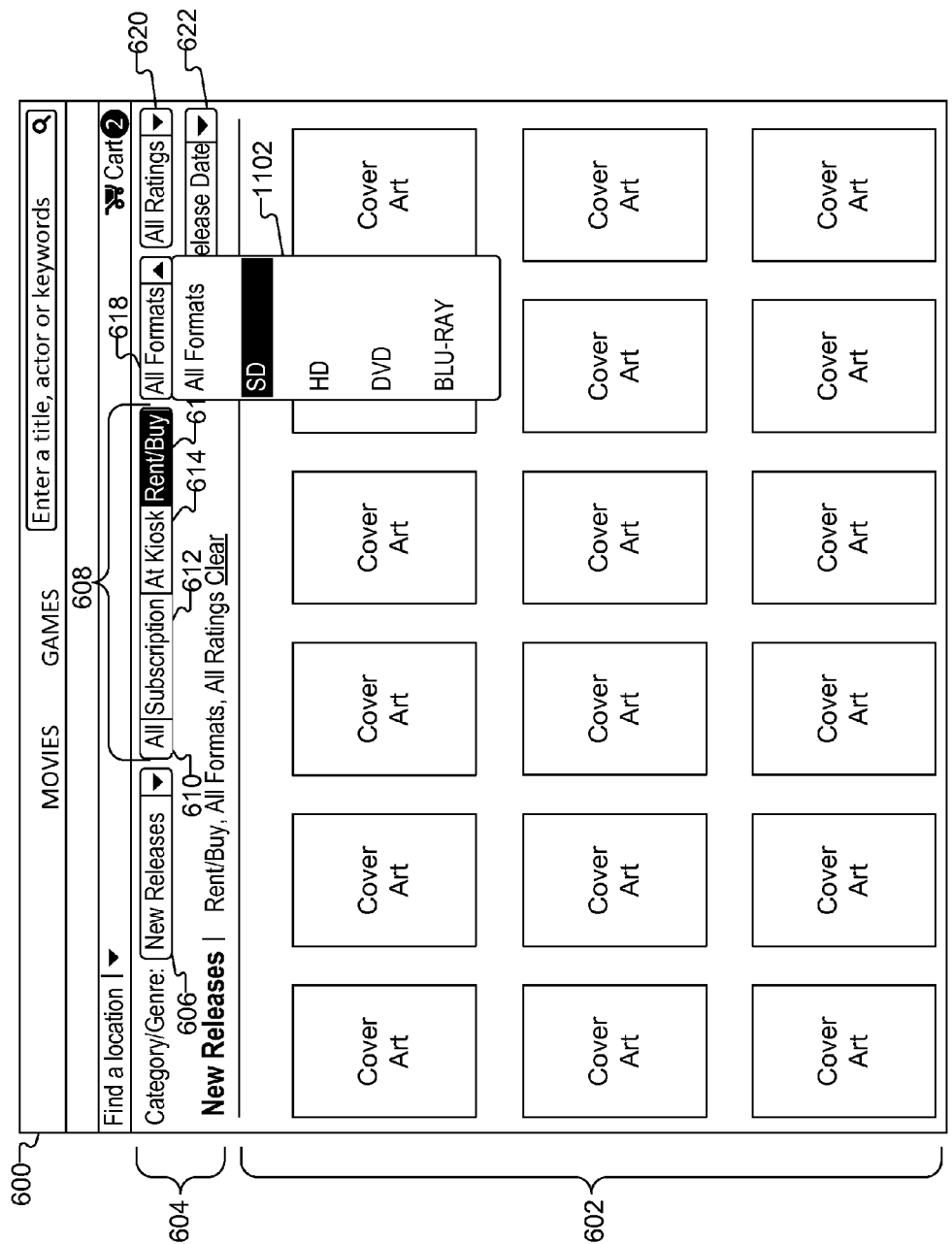
Figure 12:
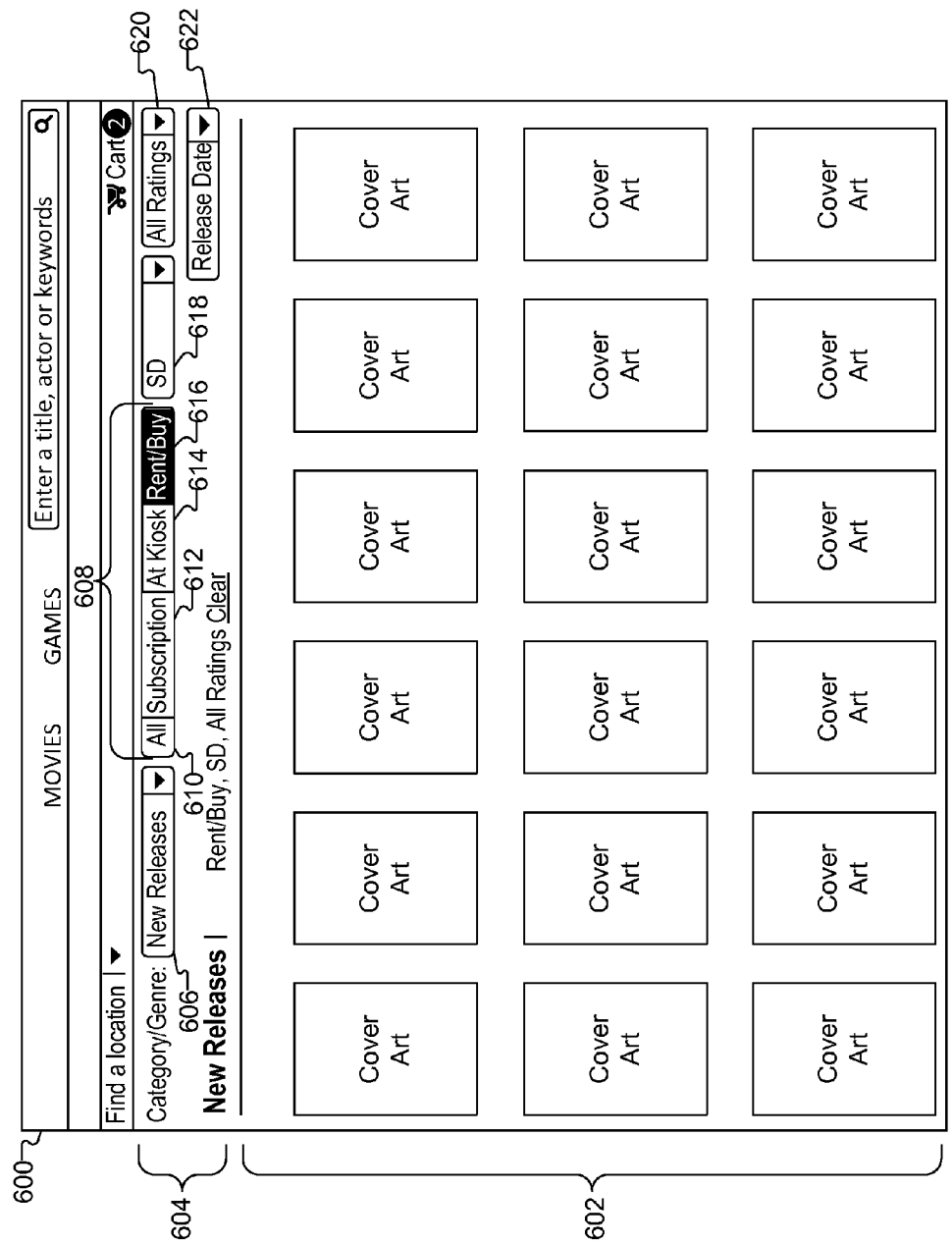

With the rent/buy browse context presented in browse view 600 as shown in FIG. 10, the user may utilize media format selection tool 618 to select a value of a media format refinement setting. For example, the user may select the drop-down arrow of media format selection tool 618, and user interface facility 106 may respond by providing a drop-down menu 1102 of media format options as shown in FIG. 11. The user may provide input to select the "SD" option, as shown in FIG. 11. In response, user interface facility 106 may update browse view 600 accordingly. For example, user interface facility 106 may apply the "SD" value to the rent/buy browse context by further filtering the browse content in browse area 602 to include only browse content representing media programs that are available in the SD format. User interface facility 106 may also close the drop-down menu 1102 and update media format selection tool 618 to indicate that the "SD" option is the currently selected value of the media format refinement setting for the rent/buy browse context, as shown in FIG. 12. User interface facility 106 may track the selected "SD" option as the current value of the media format refinement setting mapped to the rent/buy browse context.

User interface facility 106 may be configured to use tracked refinement setting values to refine browse content for any of the browse contexts selected for presentation in browse view 600. To illustrate, while browse view 600 is displayed as shown in FIG. 12, the user may select option 612 to toggle from the currently presented rent/buy browse context back to the subscription browse context. User interface facility 106 may detect the selection of option 612 and update browse view 600 accordingly. For example, user interface facility 106 may highlight option 612 as shown in FIG. 9. User interface facility 106 may also update the browse content in browse area 602 to include only browse content representing media programs distributed by way of the subscription distribution model.

In addition, in response to the selection of option 612, user interface facility 106 may automatically set the values of refinement settings to the tracked values of the refinement settings for the subscription browse context. This may include changing the current value of the media format refinement setting from the "SD" value associated with the rent/buy browse context to the "HD" value of the media format refinement setting based on the tracked mapping of the "HD" value of the media format refinement setting to the subscription browse context. In FIG. 9, media format selection tool 618 indicates that the "HD" option is the currently selected value of the media format refinement setting. User interface facility 106 may automatically apply the "HD" value of the media format refinement setting to refine the browse content in browse area 602 to represent only media programs that are available in the HD media format.

In the above-described or similar manner, browse view 600 may be updated to present the subscription browse context associated with the subscription distribution model as part of toggling from another browse context to the subscription browse context.

Figure 13:
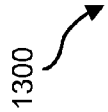
FIG. 13 illustrates a table representing exemplary mappings of tracked values of a plurality of refinement settings to media program browse contexts according to principles described herein.

FIG. 13 illustrates a table 1300 that includes data representing tracked values of a plurality of refinement settings mapped to browse contexts. Table 1300 may represent tracked current values of refinement settings as the values exist after the user has provided input to change values of the media format refinement setting to the "HD" value for the subscription browse context and to the "SD" value for the rent/buy browse context, as described above.

User interface facility 106 may be configured to update table 1300 to reflect tracked changes to refinement setting values with respect to each of the browse contexts. The updates may be performed in response to a user providing input to change a refinement setting value or in response to any other predefined event. In certain examples, user interface facility 106 may be configured to reset the tracked values of the refinement settings in response to an occurrence of a predefined event such as a termination of a user interface session or user input requesting that the values be reset to default values.

In certain examples, user interface facility 106 may be configured to provide contextually selected menu options within menus presented in a user interface. To this end, user interface facility 106 may dynamically select a set of options to include in a menu in the user interface based on a context of the user interface. For example, user interface facility 106 may select a set of menu options (e.g., a set of refinement setting options) based on which browse context is presented in the user interface. To illustrate, when a browse context associated with a digital distribution model is presented in the user interface, user interface facility 106 may select only menu options that are relevant to the digital distribution model for inclusion in a menu in the user interface, and when a browse context associated with a physical distribution model is presented in the user interface, user interface facility 106 may select only menu options that are relevant to the physical distribution model for inclusion in a menu in the user interface.

Figure 14:
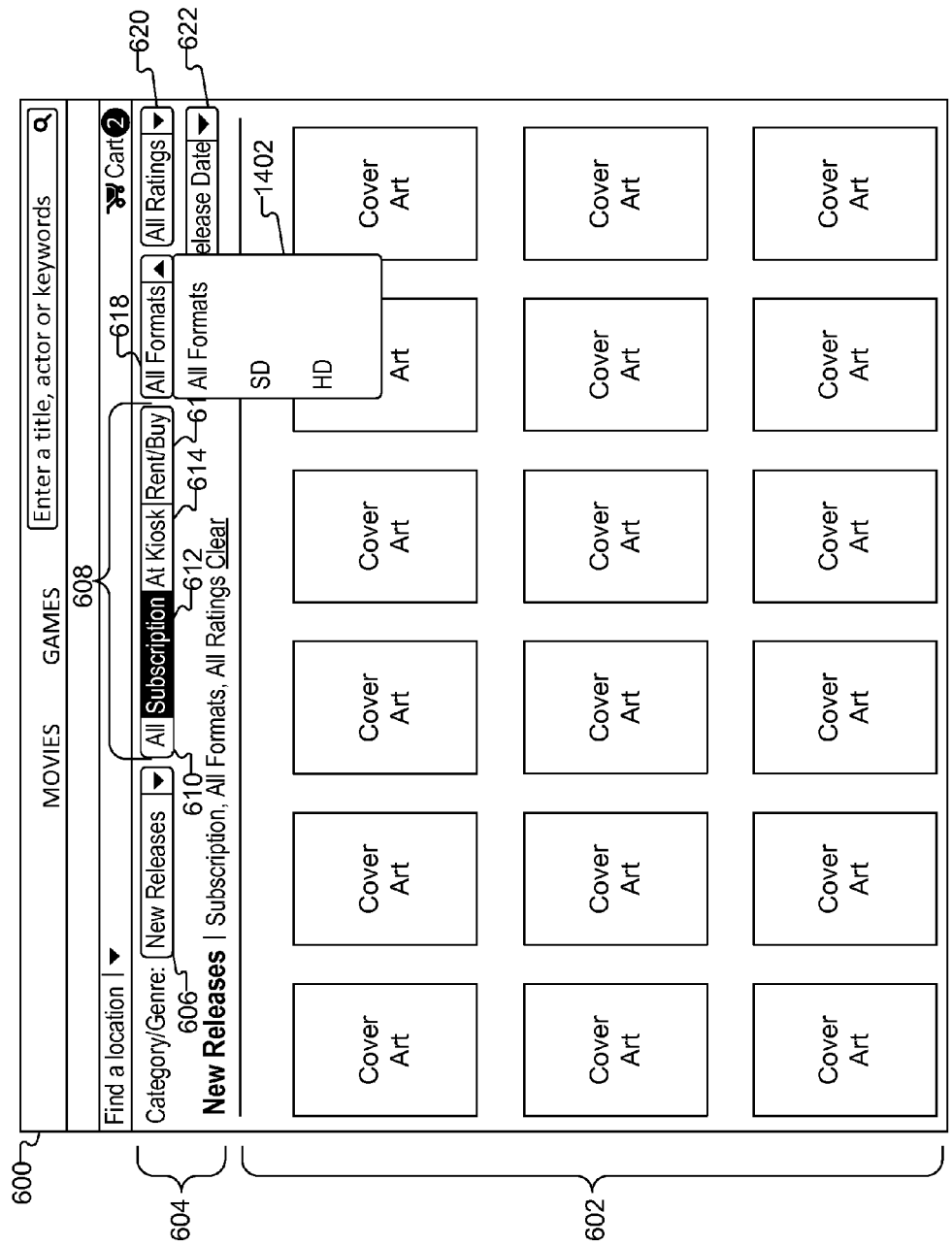
FIG. 14 illustrates an example of a media browse view of a user interface according to principles described herein.

As an example, in response to a user request to access a menu of media formats associated with media format selection tool 618, user interface facility 106 may determine the browse context currently presented in the user interface and select, from all of the available media format options, a set of one or more media format options that are relevant to the browse context. FIG. 14 illustrates an example of browse view 600 in which a drop-down menu 1402 associated with media format selection tool 618 is presented. As shown, the menu includes only media format options, including an "all formats" option, an "SD" option, and an "HD" option, that are relevant to the subscription browse context presented in browse view 600 in FIG. 14. These options are relevant because media programs are available in the "SD" and "HD" media formats by way of the subscription browse context. Other options that are not relevant to the subscription browse context (e.g., "DVD" and "BLU-RAY" options) are omitted from drop-down menu 1402.

User interface facility 106 may similarly select menu options for inclusion in other menus of the user interface based on a context of the user interface. As an example, a media format menu may include only an "all formats" option, a "DVD" option, and a "BLU-RAY" option when a kiosk browse context is presented in the user interface.

Figure 15:
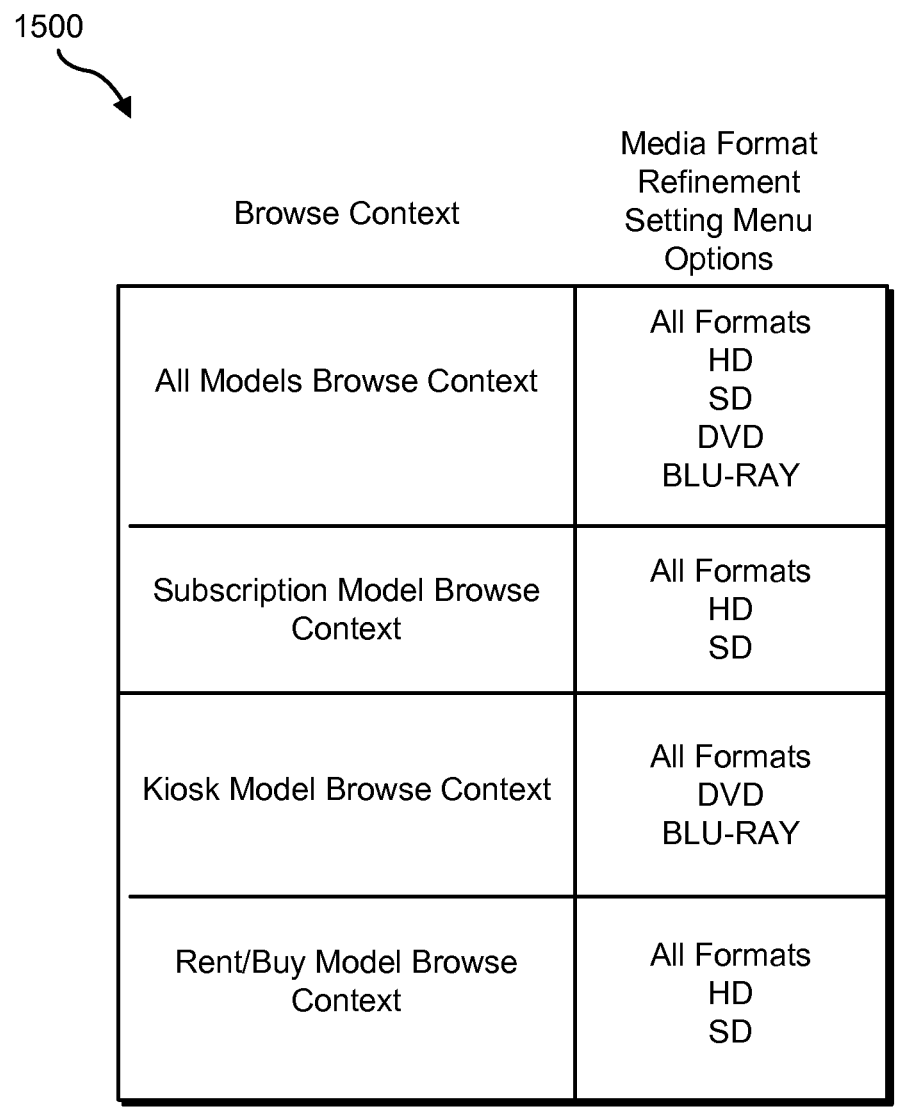
FIG. 15 illustrates a table representing exemplary mappings of sets of refinement setting menu options to media program browse contexts according to principles described herein.

FIG. 15 illustrates a table 1500 that includes data representing sets of refinement setting menu options mapped to browse contexts. When user interface facility 106 receives a request to present a menu of media format refinement setting options within a particular browse context, user interface facility 106 may select a particular set of menu options based on the mappings illustrated in table 1500. For example, user interface facility 106 may present a set of options that includes an "All Formats" option, an "HD" option, an "SD" option, a "DVD" option, and a "BLU-RAY" option within an "All" models browse context, a set of options that includes only an "All Formats" option, an "HD" option, and an "SD" option in a "Subscription" model browse context, a set of options that includes only an "All Formats" option, a "DVD" option, and a "BLU-RAY" option in a "Kiosk" model browse context, and a set of options that includes only an "All Formats" option, an "HD" option, and an "SD" option in a "Rent/Buy" model browse context, As another example, a menu of media formats and/or a menu of media ratings may include select sets of menu options relevant to a user interface context in which browse content is filtered to represent only a specific type of media programs. For example, when a video games type media program browse context is presented in the user interface, user interface facility 106 may define a media format menu to include options representing media formats for gaming platforms. For instance, the menu may indicate that media programs are available for the Wii, Xbox, and PS3 gaming consoles. Additionally or alternatively, when the video games browse context is presented in the user interface, user interface facility 106 may define a media ratings menu to include options representing media ratings for video games. For instance, the menu may include Entertainment Software Rating Board ("ESRB") ratings such as "EC" for early childhood, "E" for everyone, "E10+" for everyone over age 10, "T" for teen, "M" for mature audiences only, "RP" for rating pending, and "all ratings" options.

As another example, when a movies type media program browse context is presented in the user interface, user interface facility 106 may define a media format menu to include options representing media formats for movies. For instance, the menu may indicate that media programs are available in HD, SD, DVD, BLU-RAY, and/or other video and/or audio formats. Additionally or alternatively, when the movies browse context is presented in the user interface, user interface facility 106 may define a media ratings menu to include options representing media ratings for movies. For instance, the menu may include MPAA ratings such "G" for general audiences, "PG" for parental guidance suggested, "PG-13" for parents strongly cautioned, "R" for restricted, "Unrated" for unrated, "NR" for not rated, and "all ratings" options.

The exemplary user interface views described herein and/or shown in the drawings are illustrative only. A browse context, a browse context selection tool, and/or one or more refinement tools, in any suitable form, may be included in one or more other views of a user interface as may suit a particular implementation.

Figure 16:
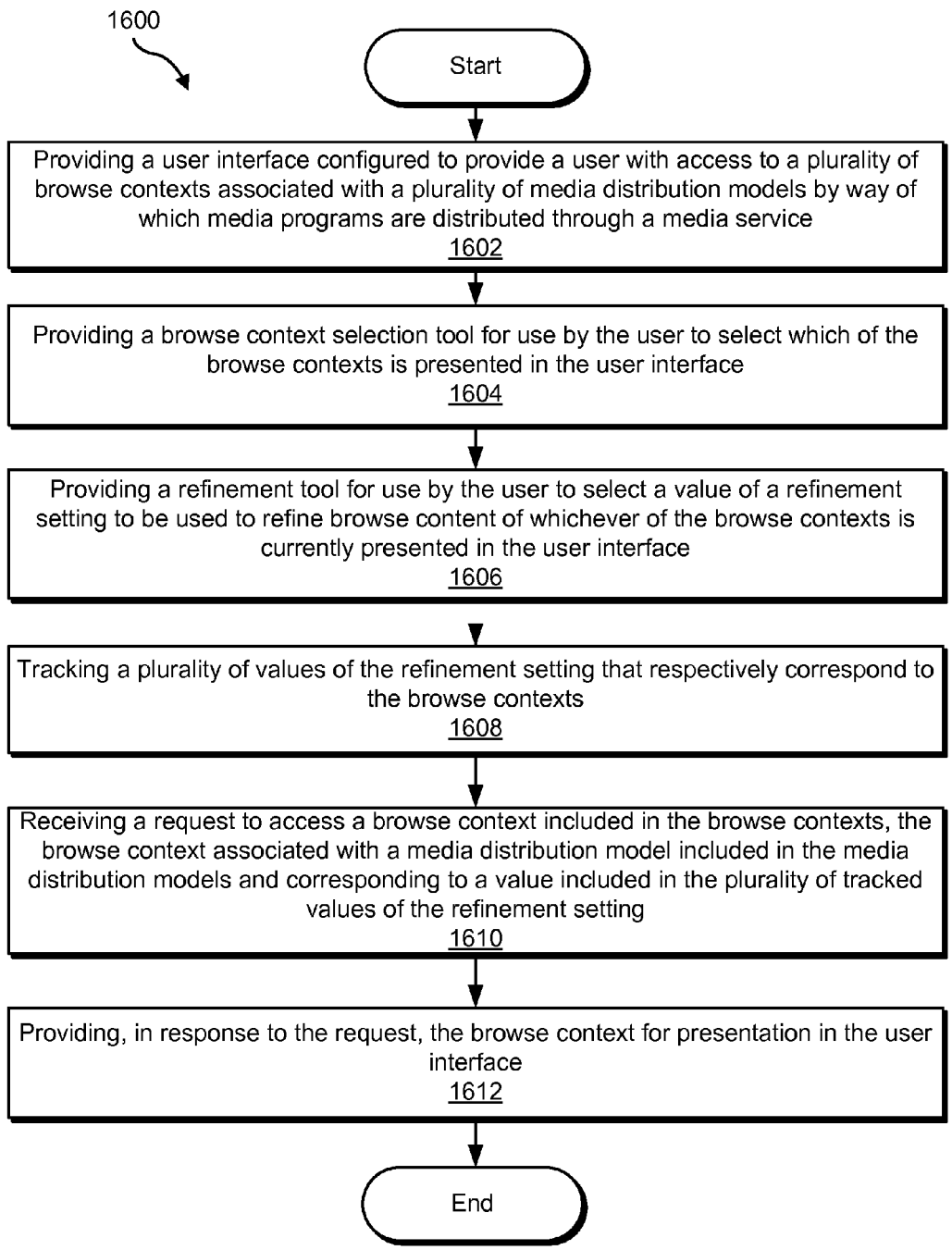
FIGS. 16-17 illustrate exemplary methods of facilitating browsing of media programs according to principles described herein.
Figure 17:
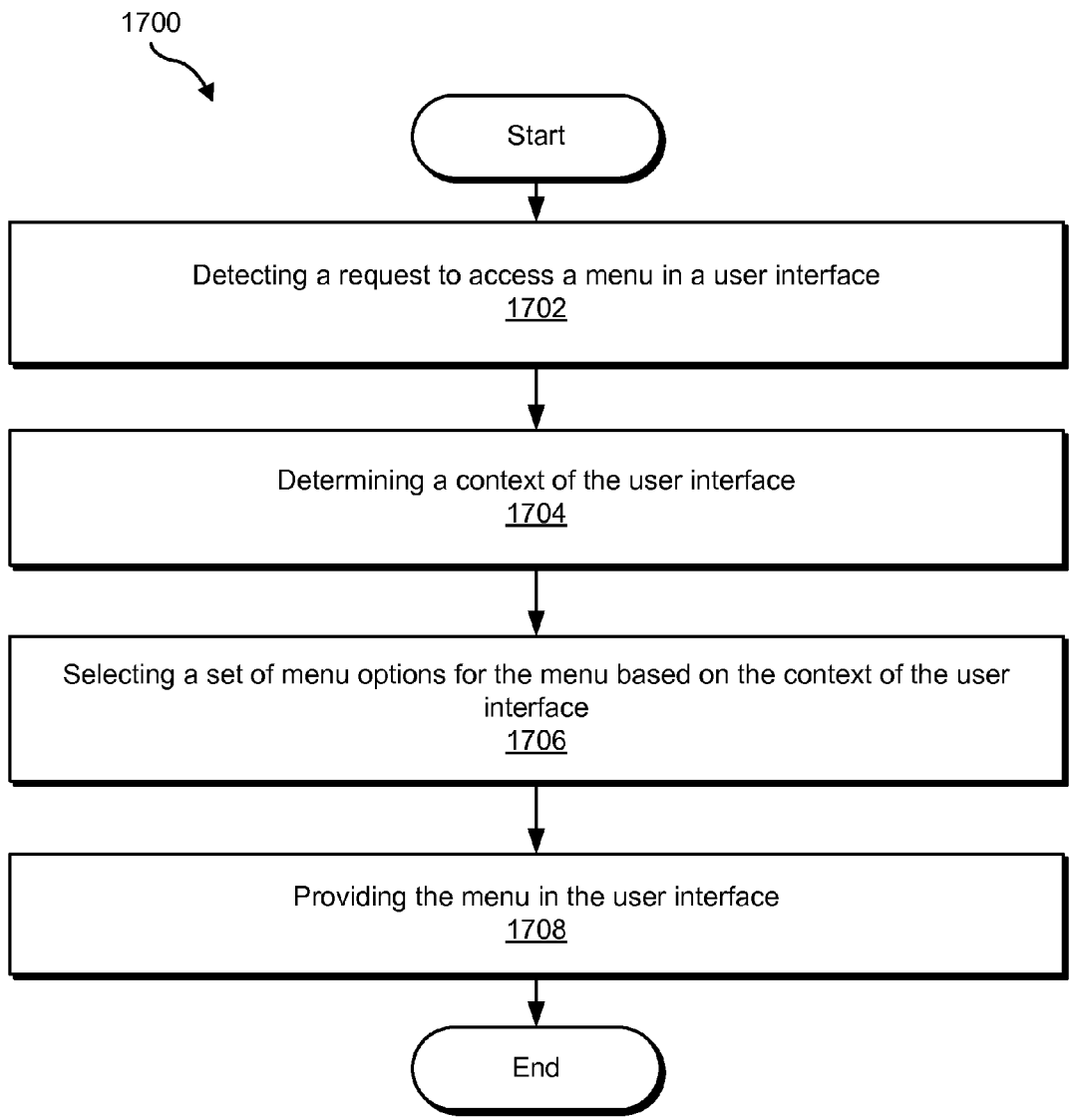

FIGS. 16-17 illustrate exemplary methods 1600-1700 of facilitating browsing of media programs according to principles described herein. While FIGS. 16-17 illustrate exemplary steps according to certain embodiments, other embodiments may omit, add to, reorder, combine, and/or modify any of the steps shown in FIGS. 16-17. In certain embodiments, one or more of the steps shown in FIGS. 16-17 may be performed by system 100 and/or one or more components or implementations of system 100.

Turning to the method 1600 illustrated in FIG. 16, in step 1602, a system (e.g., system 100) provides a user interface configured to provide a user with access to a plurality of browse contexts associated with a plurality of media distribution models by way of which media programs are distributed through a media service, such as described herein.

In step 1604, the system provides a browse context selection tool for use by the user to select which of the browse contexts is presented in the user interface, such as described herein.

In step 1606, the system provides a refinement tool for use by the user to select a value of a refinement setting to be used to refine browse content of whichever of the browse contexts is currently presented in the user interface, such as described herein.

In step 1608, the system tracks a plurality of values of the refinement setting that respectively correspond to the browse contexts. Step 1608 may be performed in any of the ways described herein and may include tracking an individual value of the refinement setting for each of the browse contexts, such as described herein.

In step 1610, the system receives a request to access a browse context included in the browse contexts, the browse context associated with a media distribution model included in the media distribution models and corresponding to a value included in the plurality of tracked values of the refinement setting, such as described herein.

In step 1612, the system provides, in response to the request, the browse context for presentation in the user interface, such as described herein. As described herein, step 1612 may include using the tracked value of the refinement setting for the browse context to provide the browse context for presentation in the user interface.

Turning to the method 1700 illustrated in FIG. 17, in step 1702, a system (e.g., system 100) detects a request to access a menu in a user interface. Step 1702 may be performed in any of the ways described herein and may include a request for a menu associated with a refinement tool, such as described herein.

In step 1704, the system determines a context of the user interface. Step 1704 may be performed in any of the ways described herein and may include the system determining a browse context such as a media-distribution-model-based, a media-program-type-based, or a media-program-category-based browse context of the user interface.

In step 1706, the system selects a set of menu options for the menu based on the context of the user interface, such as described herein (e.g., based on relevancy of the menu options to the context).

In step 1708, the system provides the menu in the user interface, the menu including the dynamically selected set of menu options, such as described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 18:
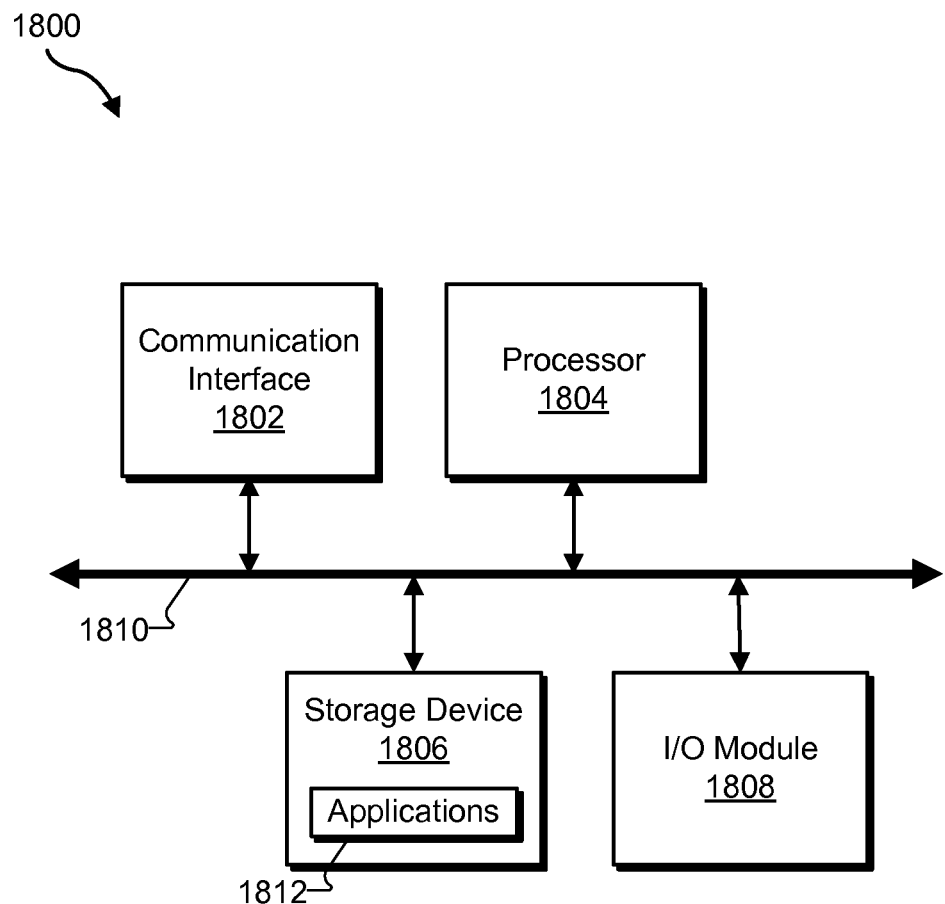
FIG. 18 illustrates an exemplary computing device according to principles described herein.

FIG. 18 illustrates an exemplary computing device 1800 that may be configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, and any other suitable interface. Communication interface 1802 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1802 may be configured to interface with any suitable communication media, protocols, and formats.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another non-transitory computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1806. For example, data representative of one or more executable applications 1812 (which may include, but are not limited to, one or more of the software applications described herein) configured to direct processor 1804 to perform any of the operations described herein may be stored within storage device 1806. In some examples, data may be arranged in one or more databases residing within storage device 1806.

I/O module 1808 may be configured to receive user input and provide user output and may include any hardware, firmware, software, or combination thereof supportive of input and output capabilities. For example, I/O module 1808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1800. For example, one or more applications 1812 residing within storage device 1806 may be configured to direct processor 1804 to perform one or more processes or functions associated with one or more of the systems and/or facilities described herein. Likewise, any of the storage facilities described herein may be implemented by or within storage device 1806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

providing, by a media service provider system, a user interface configured to provide a user with access to a plurality of browse contexts associated with a plurality of media distribution models by way of which media programs are distributed through a media service;

providing, by the media service provider system in the user interface, a browse context selection tool for use by the user to select which of the browse contexts is presented in the user interface;

providing, by the media service provider system in the user interface, a refinement tool for use by the user to select a value of a refinement setting to be used to refine browse content of whichever of the browse contexts is currently presented in the user interface, the refinement tool including a set of user-selectable refinement setting menu options that is specific to whichever of the browse contexts is currently presented in the user interface; and tracking, by the media service provider system throughout a user interface session, a plurality of values of the refinement setting that respectively correspond to the browse contexts.

2. The method of claim 1, further comprising:

receiving, by the media service provider system during the user interface session, a request to access a first browse context included in the browse contexts, the first browse context associated with a first media distribution model included in the media distribution models and corresponding to a first value included in the plurality of tracked values of the refinement setting; and providing, by the media service provider system in response to the request, the first browse context for presentation in the user interface by filtering, based on the first media distribution model associated with the first browse context, the media programs distributed through the media service to determine a filtered set of the media programs for the first browse context, refining, based on the first value of the refinement setting corresponding to the first browse context, the filtered set of the media programs for the first browse context to determine a refined filtered set of the media programs for the first browse context, and populating the first browse context with browse content representing the refined filtered set of the media programs for the first browse context.

3. The method of claim 2, further comprising:

receiving, by the media service provider system during the user interface session, a request to access a second browse context included in the browse contexts, the second browse context associated with a second media distribution model included in the media distribution models and corresponding to a second value included in the plurality of tracked values of the refinement setting; and providing, by the media service provider system in response to the request, the second browse context for presentation in the user interface by filtering, based on the second media distribution model associated with the second browse context, the media programs distributed through the media service to determine a filtered set of the media programs for the second browse context, refining, based on the second value of the refinement setting corresponding to the second browse context, the filtered set of the media programs for the second browse context to determine a refined filtered set of the media programs for the second browse context, and populating the second browse context with browse content representing the refined filtered set of the media programs for the second browse context.

4. The method of claim 3, wherein the providing of the second browse context for presentation in the user interface is part of a toggling from a presentation of the first browse context to a presentation of the second browse context in the user interface.

5. The method of claim 3, wherein:
the first media distribution model comprises a digital media distribution model that utilizes a digital media distribution channel; and
the second media distribution model comprises a physical media distribution model that utilizes a physical media distribution channel.

6. The method of claim 5, wherein the physical media distribution channel comprises a media vending kiosk-based distribution channel.

7. The method of claim 3, wherein:
the first media distribution model comprises a subscription-based media distribution model; and
the second media distribution model comprises a transactional-based media distribution model.

8. The method of claim 1, wherein the browse context selection tool comprises a menu of toggle buttons associated with the media distribution models.

9. The method of claim 1, wherein the refinement tool further comprises a media format selection tool that facilitates selection of a user-selectable refinement setting menu option included in the set of user-selectable refinement setting menu options.

10. The method of claim 1, wherein the refinement tool further comprises a media rating selection tool that facilitates selection of a user-selectable refinement setting menu option included in the set of user-selectable refinement setting menu options.

11. The method of claim 1, wherein the refinement tool further comprises a media sort selection tool that facilitates selection of a user-selectable sort option.

12. The method of claim 1, embodied as computer-executable instructions on at least one non-transitory computer-readable medium.

13. The method of claim 1, wherein the refinement tool facilitates selection of the value of the refinement setting to be used to refine browse content of whichever of the browse contexts is currently presented in the user interface without changing whichever of the browse contexts is currently presented in the user interface to a different browse context.

14. A method comprising:
providing, by a media service provider system in a user interface, a media browse view that provides a user with access to a plurality of media program browse contexts associated with a plurality of media distribution models by way of which media programs are distributed through a media distribution service;
providing, by the media service provider system in the media browse view, a refinement tool for use by the user to select a value of the refinement setting to be used to refine browse content of whichever of the browse contexts is currently presented in the media browse view, the refinement tool including a set of user-selectable refinement setting menu options that is specific to whichever of the browse contexts is currently presented in the user interface;

tracking, by the media service provider system during a user interface session, a plurality of values of a refinement setting for the plurality of media program browse contexts;
receiving, by the media service provider system during the user interface session, a request to access a media program browse context included in the plurality of media program browse contexts, the media program browse context associated with a media distribution model included in the plurality of media distribution models and a particular value of the refinement setting included in the plurality of values of the refinement setting; and
providing, by the media service provider system in response to the request, the media program browse context for display in the media browse view, the providing of the media program browse context comprising
filtering, based on the media distribution model associated with the media program browse context, the media programs distributed through the media distribution service to determine a filtered set of the media programs,
refining, based on the particular value of the refinement setting for the media program browse context, the filtered set of the media programs to determine a refined filtered set of the media programs, and
populating the media program browse context with browse content representing the refined filtered set of the media programs.

15. The method of claim 14, wherein tracking comprises:
detecting, during the user interface session, a user selection of the particular value of the refinement setting; and
mapping, in response to the user selection, the particular value of the refinement setting to the media program browse context.

16. The method of claim 14, further comprising providing, by the media service provider system in the media browse view, a browse context selection tool for use by the user to select which of the browse contexts is presented in the media browse view.

17. The method of claim 14, embodied as computer-executable instructions on at least one non-transitory computer-readable medium.

18. A system comprising:
at least one physical computer processor; and
a user interface facility that directs the at least one physical computer processor to:
provide a user interface configured to provide a user with access to a plurality of browse contexts associated with a plurality of media distribution models by way of which media programs are distributed through a media service;
provide, in the user interface, a browse context selection tool for use by the user to select which of the browse contexts is presented in the user interface;
provide, in the user interface, a refinement tool for use by the user to select a value of a refinement setting to be used to refine browse content of whichever of the browse contexts is currently presented in the user interface, the refinement tool including a set of user-selectable refinement setting menu options that is specific to whichever of the browse contexts is currently presented in the user interface; and
track, throughout a user interface session, a plurality of values of the refinement setting that respectively correspond to the browse contexts.

19. The system of claim 18, wherein the user interface facility further directs the at least one physical computer processor to provide a browse context included in the plurality of browse contexts for presentation in the user interface by:
- filtering, based on a media distribution model included in the plurality of media distribution models and associated with the browse context, the media programs distributed through the media service to determine a filtered set of the media programs for the browse context,
- refining, based on a particular value of the refinement setting included in the plurality of values of the refinement setting and corresponding to the browse context, the filtered set of the media programs for the browse context to determine a refined filtered set of the media programs for the browse context, and
- populating the browse context with browse content representing the refined filtered set of the media programs for the browse context.

20. The system of claim 19, wherein the plurality of media distribution models comprises at least one digital media distribution model that utilizes a digital media distribution channel and a physical media distribution model that utilizes a physical media distribution channel.

21. The system of claim 20, wherein:
- the at least one digital media distribution model that utilizes a digital media distribution channel comprises a digital subscription-based media distribution model and a digital transactional-based media distribution model; and
- the physical media distribution channel comprises a media vending kiosk-based distribution channel.

22. The system of claim 18, wherein the browse context selection tool comprises a menu of browse context toggle buttons associated with the media distribution models.

23. The system of claim 18, wherein the refinement tool comprises one of a media format selection tool, a media rating selection tool, and a media sort selection tool that facilitate selection of a user-selectable refinement setting menu option included in the set of user-selectable refinement setting menu options.

* * * * *